United States Patent [19]
Schwarz et al.

[11] Patent Number: 5,221,144
[45] Date of Patent: Jun. 22, 1993

[54] RESEALABLE PACKAGES AND METHOD AND APPARATUS FOR PRODUCING SAME

[75] Inventors: Gunther Schwarz, Waterloo, Canada; Ronald E. Merrill, Cohasset, Mass.

[73] Assignees: T W Kutter, Inc., Avon, Mass.; Kramer & Grebe GmbH & Co. K.G., Biedenkopf-Wallau, Fed. Rep. of Germany

[21] Appl. No.: 588,831

[22] Filed: Sep. 27, 1990

Related U.S. Application Data

[62] Division of Ser. No. 303,580, Jan. 27, 1989, Pat. No. 4,969,309.

[51] Int. Cl.⁵ .............................................. B65D 33/24
[52] U.S. Cl. .......................................... 383/63; 383/61
[58] Field of Search ................... 383/61, 63, 64, 65; 493/214, 927; 156/66

[56] References Cited

U.S. PATENT DOCUMENTS

| | | | |
|---|---|---|---|
| 4,246,288 | 1/1981 | Sanborn, Jr. | 383/63 X |
| 4,532,652 | 7/1985 | Herrington | 383/63 X |
| 4,589,145 | 5/1986 | Van Erden et al. | 383/63 X |
| 4,756,629 | 7/1988 | Tilman et al. | 383/63 |
| 4,782,951 | 11/1988 | Griesbach et al. | 383/61 X |
| 4,792,240 | 12/1988 | Ausnit | 383/63 |
| 4,878,987 | 11/1989 | Van Erden | 156/66 X |
| 4,909,017 | 3/1990 | McMahon et al. | 156/66 X |
| 5,002,781 | 3/1991 | Van Erden | 383/63 X |

FOREIGN PATENT DOCUMENTS 345930 12/1989 European Pat. Off. .............. 383/63

Primary Examiner—Stephen P. Garbe
Assistant Examiner—Jes F. Pascua
Attorney, Agent, or Firm—Fish & Richardson

[57] ABSTRACT

A resealable package using zipper material and a corresponding method and apparatus are disclosed. In the package, the zipper material beads terminate entirely inboard of the outer periphery of the sealed area. The package is formed by forming a lateral loop in a first one of the webs, positioning the zipper material along the first web crossing the loop substantially at a right angle, cutting the zipper material in the region of the loop, and then straightening the first web, thereby creating a gap between the cut ends of the zipper material, then bonding the second web to the first web to form a package with a sealed area in the gap. In the preferred embodiments of the apparatus, the lateral loop forming means has at least one transversely oriented loop forming bar moveable into and away from corresponding loop forming groove(s) in a table along which one of the webs is advanced. At least one cutter knife above the table is moveable partially into the loop forming groove beneath the guide shoe to cut through the zipper material without cutting through the web material. In one preferred embodiment, the longitudinal distance between loop-forming stations may be varied to accommodate runs of different package sizes.

4 Claims, 29 Drawing Sheets

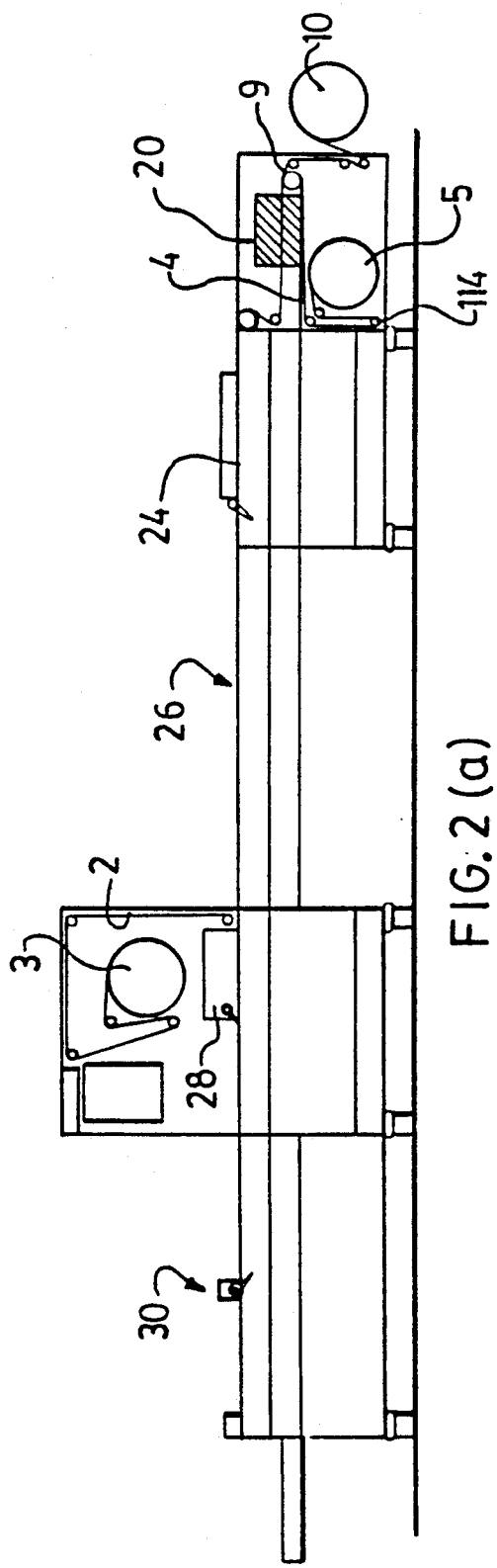
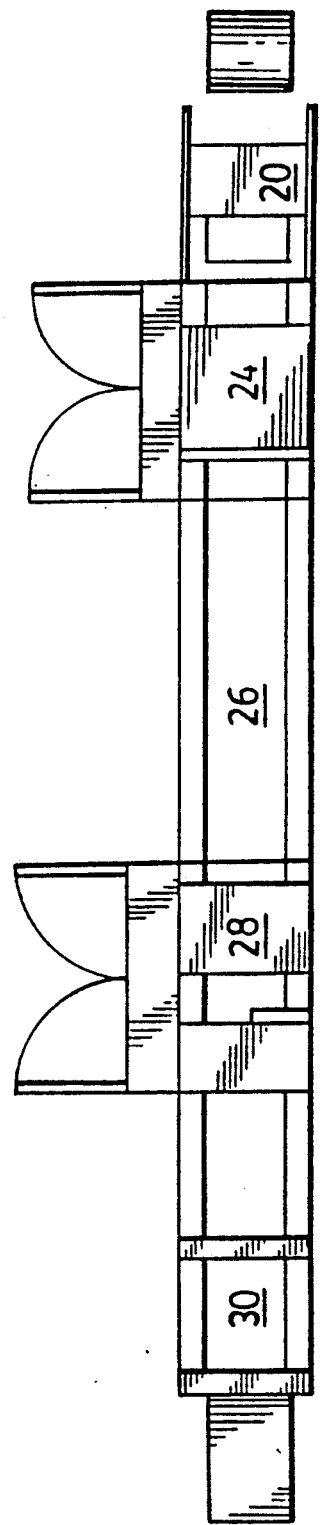
FIG.2(a)
FIG.2(b)

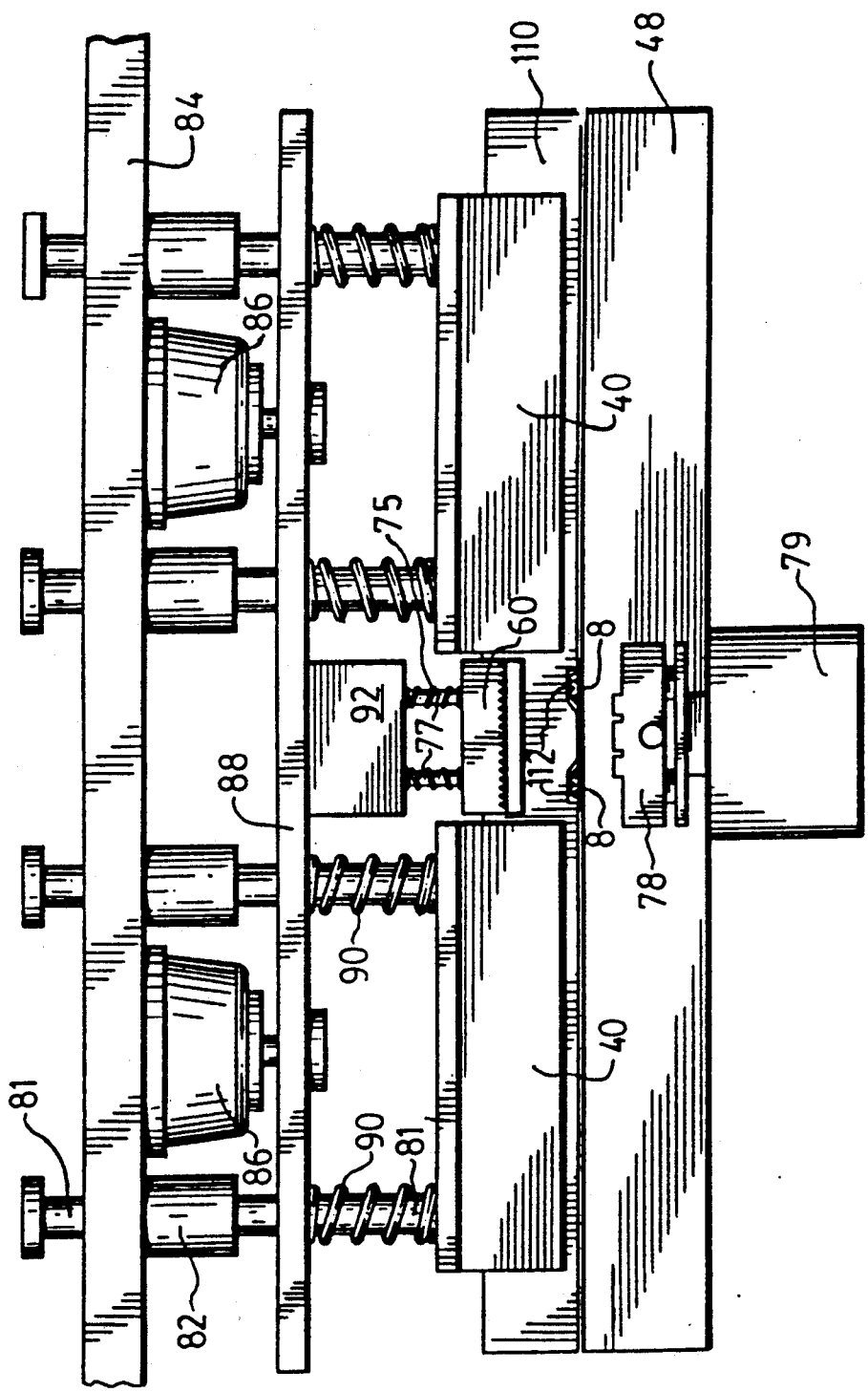

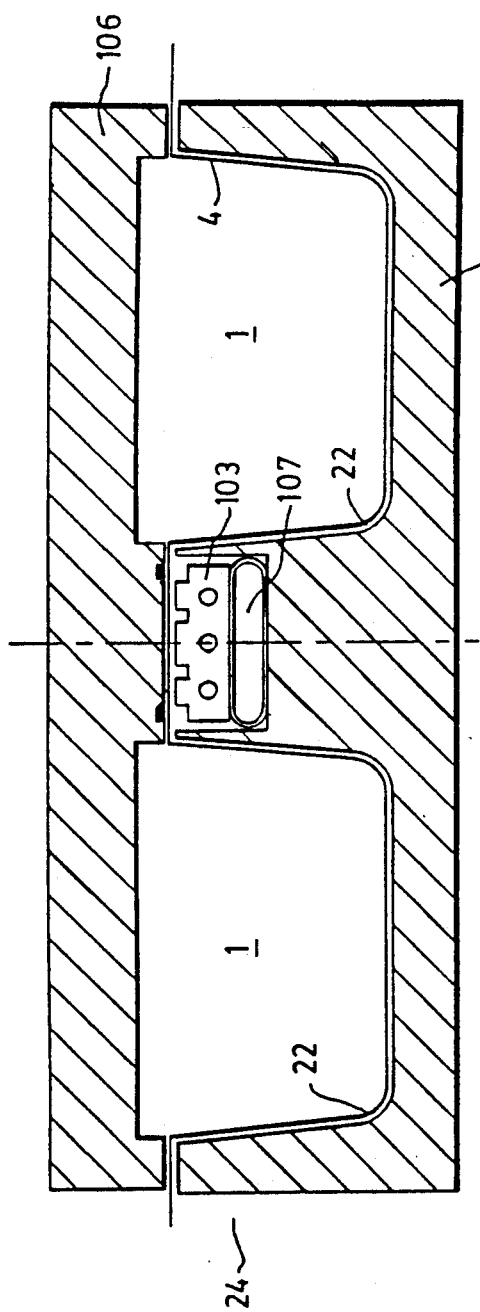
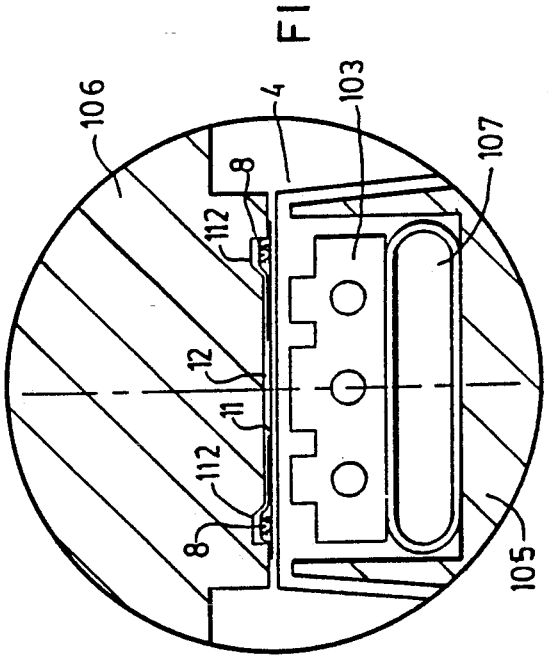
FIG.11(a)
FIG.11(b)

RESEALABLE PACKAGES AND METHOD AND APPARATUS FOR PRODUCING SAME

This application is a division of application Ser. No. 07/303,580 filed Jan. 27, 1989, now U.S. Pat. No. 4,969,309.

BACKGROUND OF THE INVENTION

1. Field of the Invention

This invention relates to vacuum packages and vacuum packaging equipment, and particularly to a resealable package configuration and apparatus for producing same. Such packages are particularly useful for food products where the package is evacuated and hermetically sealed, and where the consumer wishes to reclose the package after breaking the hermetic seal.

Many food items, such as bacon, hot dogs, cheese, luncheon meat, etc., are sold in vacuum packages formed from flexible thermoplastic materials. The packages are evacuated and hermetically sealed, and in some cases gas flushed, to preserve the freshness of the product within the package. However, the consumer often does not use all of the product immediately, and may therefore want to reclose the package. It is undesirable for the consumer to have to entirely repackage the product in, for example, a cellophane or Saran (trademark) wrap or sealable bag. Many prior art package designs therefore offer means for resealing the package.

One such means involves the use of zipper-type resealable closure strips on the two inner surfaces of the package material. These closure strips consist of thermoplastic beads either extruded with or attached to the package materials. These beads have an interlocking profile. A number of patents have been issued for such packages in the past, including those briefly described below.

2. Description of the Prior Art

Patents issued in the past relating generally to resealable packages include, for example, the following U.S. Pat. No. 2,991,001, No. 3,473,589, No. 3,780,781, No. 3,815,317, No. 4,240,241, No. 4,246,288, No. 4,572,377, No. 4,437,293, No. 4,617,683, No. 4,698,954, and No. 4,782,951.

Included in the above list are three U.S. patents assigned to W.R. Grace & Co., naming Sanborn, Jr. as inventor. U.S. Pat. No. 4,240,241, issued Dec. 23, 1980, and U.S. Pat. No. 4,437,293, issued Mar. 20, 1984, claim a method and apparatus making a reclosable package. U.S. Pat. No. 4,246,288, issued Jan. 20, 1981, claims the reclosable package itself. The reclosable package comprises an external peripheral seal and a reclosable seal on the interior side of one edge of the package. "Indentations" are punched out to remove a portion of zipper bead material in the region of the sealed area, though a central strip of material still remains.

Also included in the above list is U.S. Pat. No. 4,782,951 (Griesbach et al), granted on Nov. 8, 1988 and assigned to Oscar Meyer Foods Corporation. This patent discloses a reclosable package having interlocking closure strips positioned outside of a hermetic seal. The hermetic seal is of the peelaway type so as not to destroy the integrity of the package upon opening of the package.

The main problem in the prior art, as well described in the Oscar Meyer and Sanborn patents in particular, is that of sealing through a resealable closure or "zipper". Sealing around the zipper beads is difficult, and all too frequently small leaks result, especially after the package has been handled in transit. In the Oscar Meyer patent, the solution to this problem is to locate the zipper outside the sealed area. Though advantageous in some respects, this poses problems of its own, principally the problem that the relatively expensive "peelable" seal is essential. In the Sanborn patents, the solution is to punch out "indentations" to remove some of the zipper bead material, though as mentioned above a central strip of the zipper substrate remains.

SUMMARY OF THE INVENTION

It is an object of the invention to provide an improved resealable package, and a method and apparatus for producing same, in order to address the above-mentioned problem.

Thus in accordance with the package of the present invention there is provided a resealable package having upper and lower webs defining a product containing area between them, the webs being continuously sealed to each other around the periphery of the product containing area by a peripheral sealed area, and a resealable zipper closure positioned along one edge of the product containing area. The zipper closure has interlocking beads which effect an openable and reclosable seal, and the beads terminate inboard of the outer periphery of the sealed area, preferably slightly within the sealed area.

In accordance with the method of the present invention, the resealable package is formed by first forming a lateral loop in a first one of the webs (ordinarily the lower web), with the zipper material positioned along the web across the loop substantially at a right angle, and then cutting the zipper material in the region of the loop, then straightening the web, thereby creating a discontinuity or gap between the cut ends of the zipper material, then sealing the second web (ordinarily the upper web) to the first web to form a package with a sealed area in the gap and preferably enclosing the cut ends of the zipper material beads.

In accordance with the apparatus of the invention, there are means for forming a lateral loop in one of the webs, means for attaching resealable zipper closure material along the web crossing the loop at substantially a right angle, and means for cutting the zipper material in the region of the loop, thereby producing a discontinuity or gap in the zipper material.

In the preferred embodiments of the apparatus, the lateral loop forming means comprises at least one transversely oriented loop forming bar moveable into and away from corresponding loop forming groove(s) in a table along which the lower web is advanced.

In one embodiment of the apparatus, a longitudinal zipper material guide shoe, onto which and along which the zipper material is advanced, is positioned slightly above the table. At least one heated bonding bar is positioned beneath the table in alignment with the guide shoe and is moveable up through slots in the table to bond the web material to the zipper material between the bonding bar and the underside of the guide shoe. At least one cutter knife above the table is moveable partially into the loop forming groove beneath the guide shoe to cut through the zipper material without cutting through the web material, the guide shoe being provided with a gap through which the knife can be moved.

In an alternative embodiment of the apparatus, clamping bars are moveable to clamp the zipper material across the loop, and in which the cutting means comprises a cutting knife moveable downwardly into the area of the loop. Sealing means are provided for tacking a portion of the zipper material to the web. The loop forming bars, the clamping bars and the cutting knife are mounted in a single assembly such that actuation of the assembly towards the web and zipper material first forms the loop, then clamps zipper material to the web, and then cuts the zipper material. The distance between loop-forming stations may be varied.

Thus in the invention, the prior art problems of sealing through a resealable closure or "zipper" are avoided, in this case by cutting through the zipper material to create a gap so that the zipper material beads stop short of the outer periphery of the sealed area. This approach has the additional advantage that typically 15 mm of zipper material is saved per package, resulting in a significant overall cost saving.

Further features of the invention will be described or will become apparent in the course of the following detailed description.

BRIEF DESCRIPTION OF THE DRAWINGS

In order that the invention may be more clearly understood, preferred embodiments thereof will now be described in detail by way of example, with reference to the accompanying drawings, in which:

FIGS. 2(a) and 2(b) are schematic elevation and plan views respectively showing typical vacuum packaging equipment, and showing the location of the zipper application apparatus of the present invention.

FIG. 11(a) is an end elevation showing zipper sealing means in the forming station in the alternative embodiment;

FIG. 11(b) is an enlarged view of a portion of the ceiling means shown in FIG. 11(a).

DETAILED DESCRIPTION OF PREFERRED EMBODIMENTS OF THE INVENTION

Figure 1:
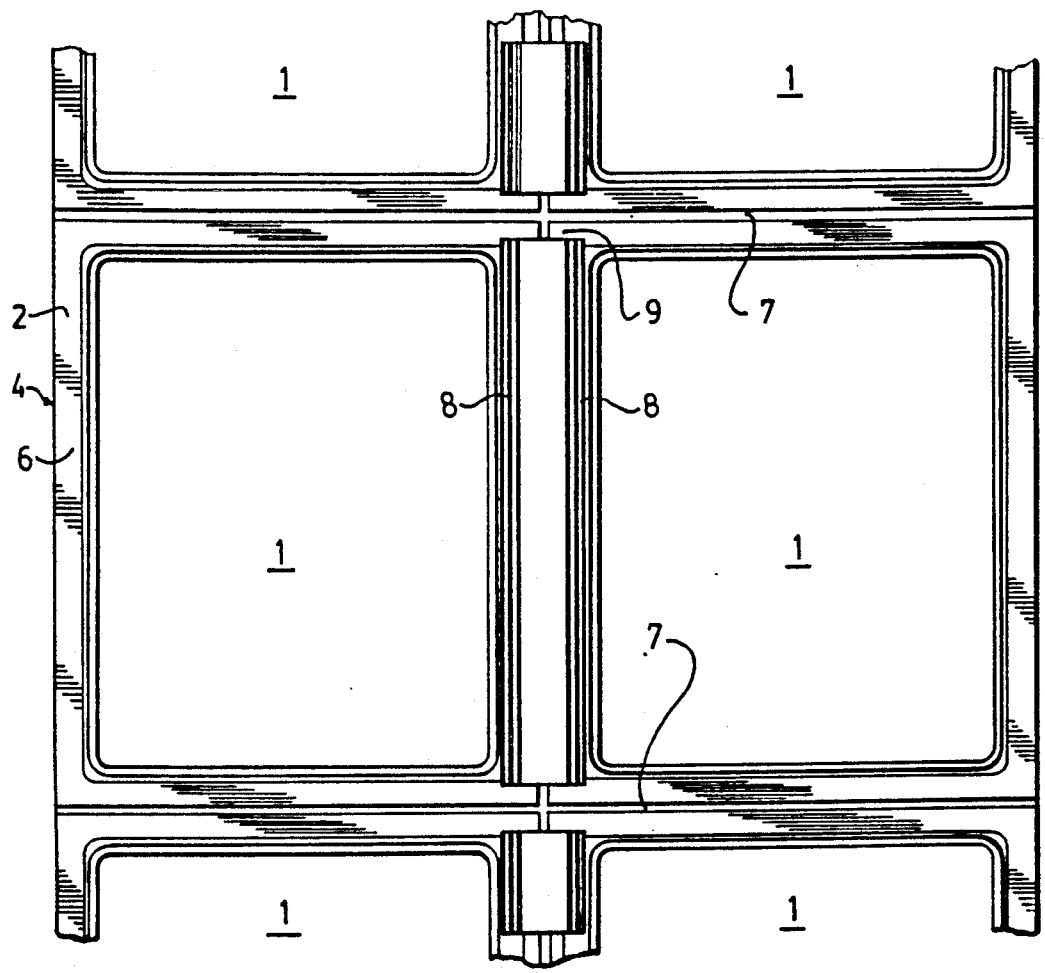
FIG. 1 is a plan view of the resealable vacuum packages produced according to the present invention.

FIG. 1, which may be regarded as sealed bags, shows resealable vacuum packages 1 produced in accordance with the invention. The packages include upper and lower plastic webs 2 and 4 respectively, hermetically sealed around their periphery by a continuous sealed area 6. The packages are eventually separated along cutting lines 7. Reclosable zipper beads 8 provided on zipper material 9 are positioned inside the sealed area of each package, running from preferably just within the sealed area at one edge of the package to preferably just within the sealed area at the opposite edge of the package, but in any event not passing fully through the sealed area.

Generally any suitable particular reclosable zipper material approved for food use may be used, such as FRESH-TRAK (trademark) reclosable zippers supplied by Presto Products Company of Appleton, Wis., United States of America. Such zipper material conventionally has interlocking plastic beads of various configurations, and is supplied on rolls. In the present invention, it is efficient to use a double zipper, i.e. two parallel zippers on one roll, so that two packages can be produced simultaneously in parallel, one on either side of the center. Two separate upper zippers halves 11 are supplied on a substrate 12 having two lower zipper halves, the substrate eventually being cut longitudinally by cutter rollers. The configuration of such zipper material can be seen in FIGS. 1, 3, and 6, though the particular configuration is not essential to the invention.

Figure 6A:
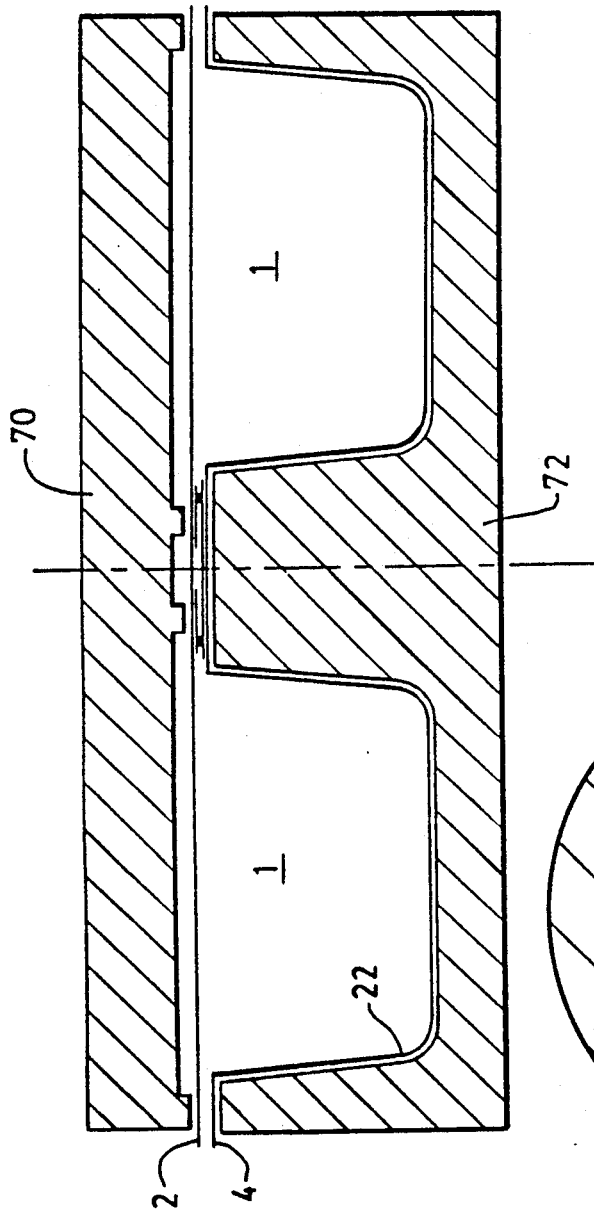
FIG. 6(a) is an end elevation showing the package sealing frame.
Figure 6B:
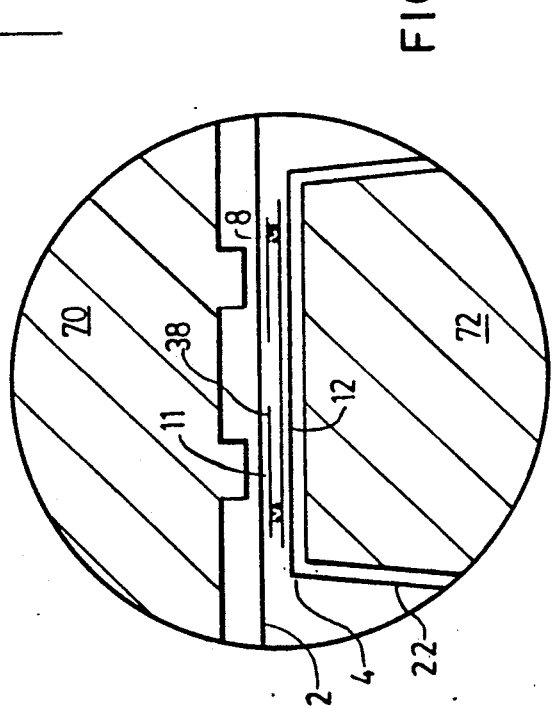
FIG. 6(b) is an enlarged view of a portion of the ceiling frame shown in FIG. 6(a)

FIG. 2 shows, in schematic form, the equipment used to produce the packages in question. With the exception of the zipper application assembly 20, the machine is essentially the same as that known generally in the prior art, such as the TIROMAT (trademark) equipment manufactured and sold by Kramer & Grebe Canada Ltd., of Waterloo, Ontario, Canada. With minor and obvious modifications, the zipper application assembly can be adapted to most vacuum packaging machines. It applies the zipper before the conventional operations of forming, filling, and sealing the packages. The forming and filing of the packages takes place exactly as in the prior art. The lower web material 4 is fed in conventional fashion from a roll 5, passing around a spring-arm mounted tensioning roller 114, and is vacuum formed in conventional fashion to produce an open container 22 at the vacuum forming station 24. However, before entering the vacuum forming station, the apparatus of the present invention applies the zipper material 9 received from a roll 10, in the manner described in greater detail below. After vacuum forming, the container is filled in conventional fashion in the loading zone 26. The upper web material 2 is then fed from a roll 3 and hermetically sealed to the lower web at the vacuum sealing station 28, as seen in FIG. 6, where the sealing frame 70 is pressed against the sealing form 72. The packages are then separated from each other laterally by cutter bars and longitudinally by cutter rollers in cutting area 30.

Figure 3:
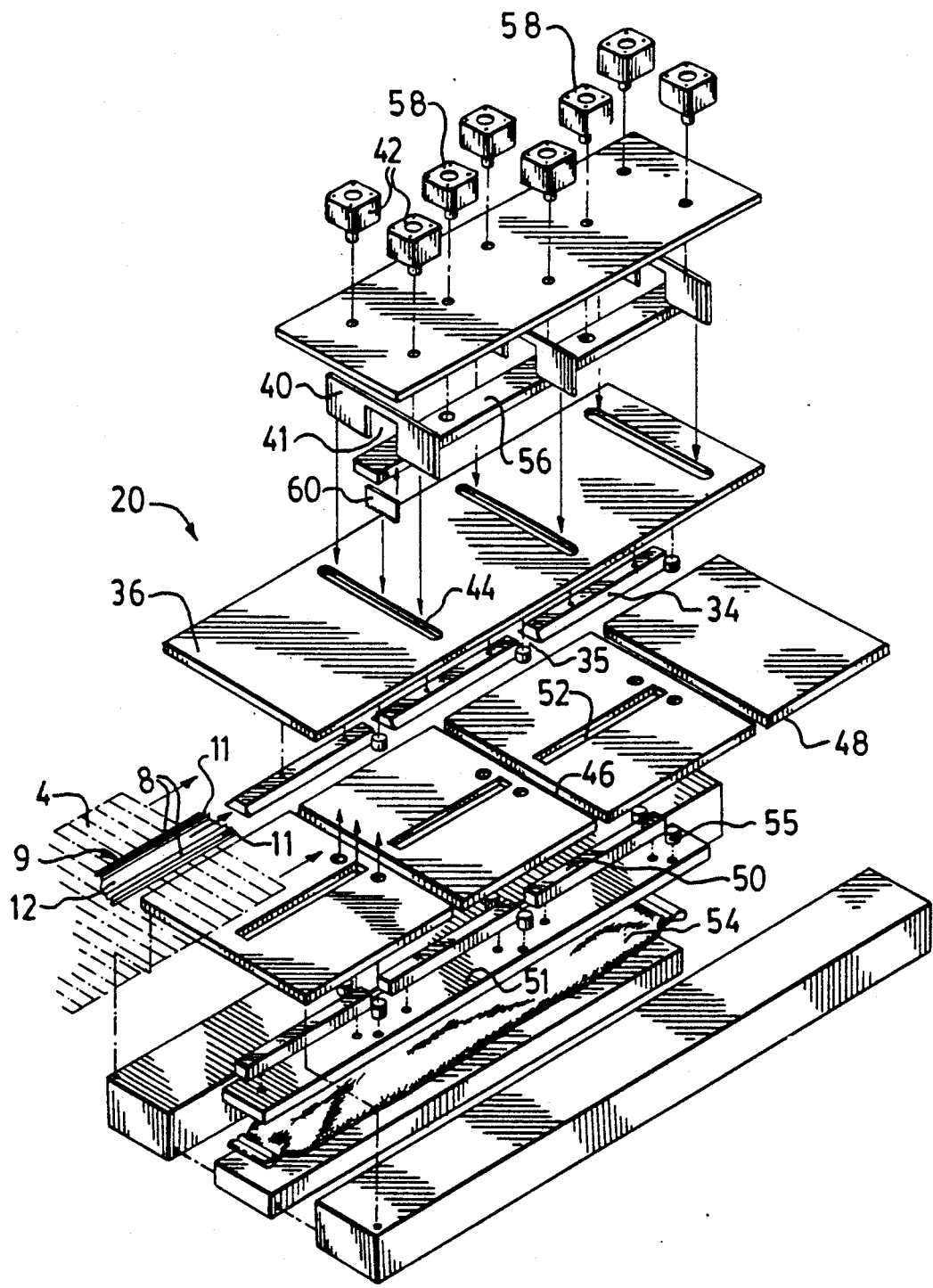
FIG. 3 is an exploded diagram of the zipper application apparatus.
Figure 4A:
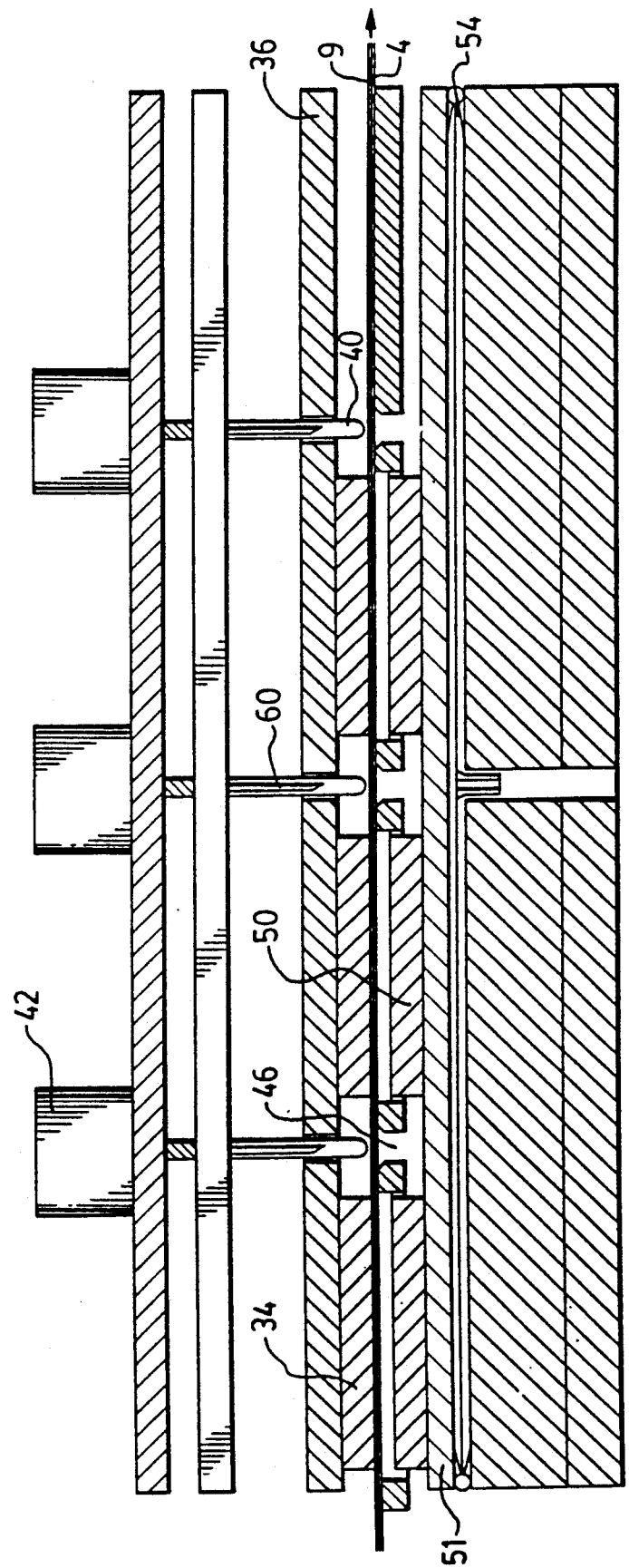
FIGS. 4(a) through 4(f) are side elevations of the zipper application apparatus showing various stages in the formation of the packages.
Figure 4B:
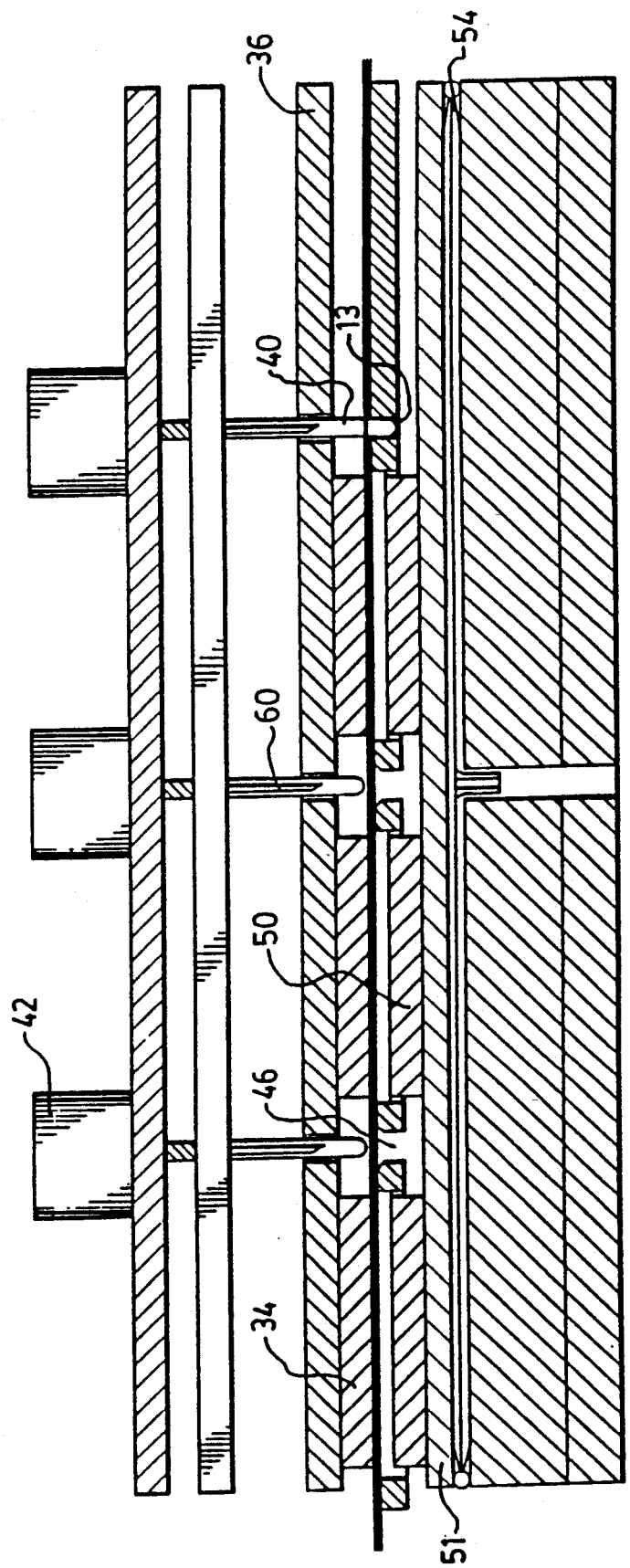
Figure 4C:
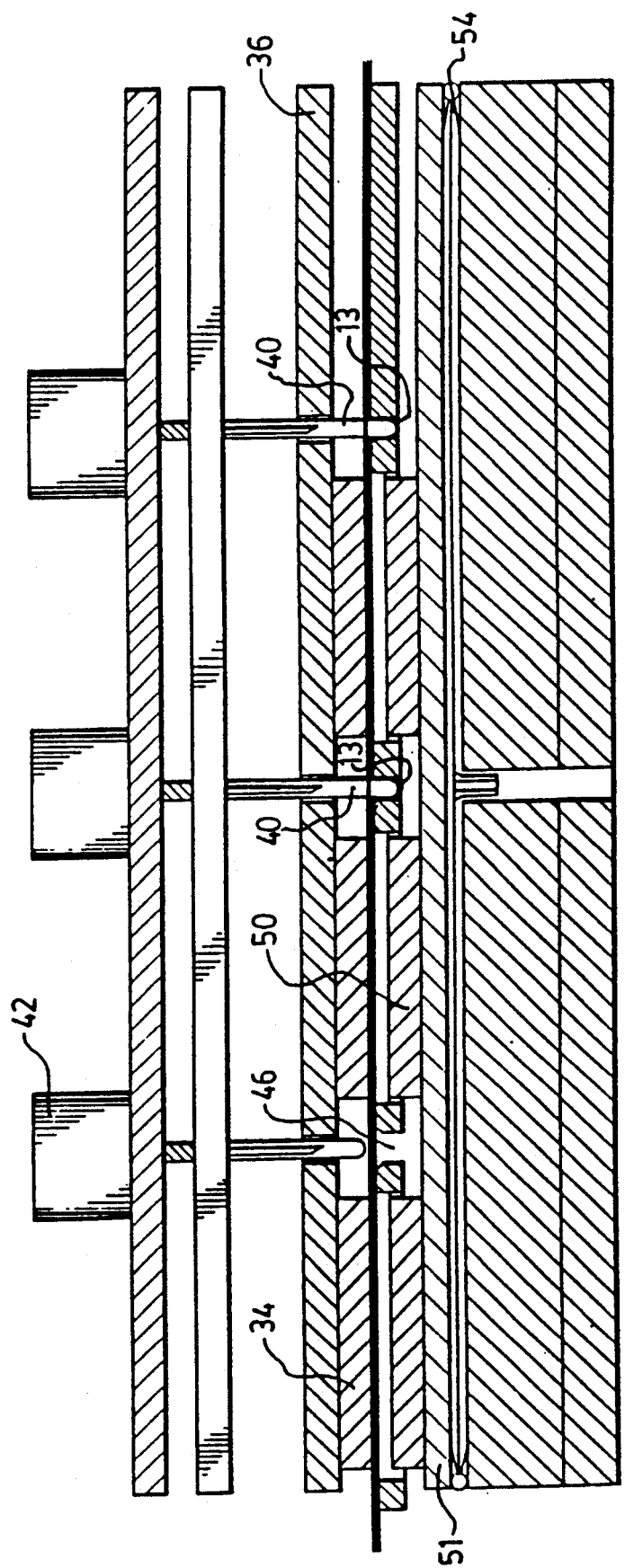
Figure 4D:
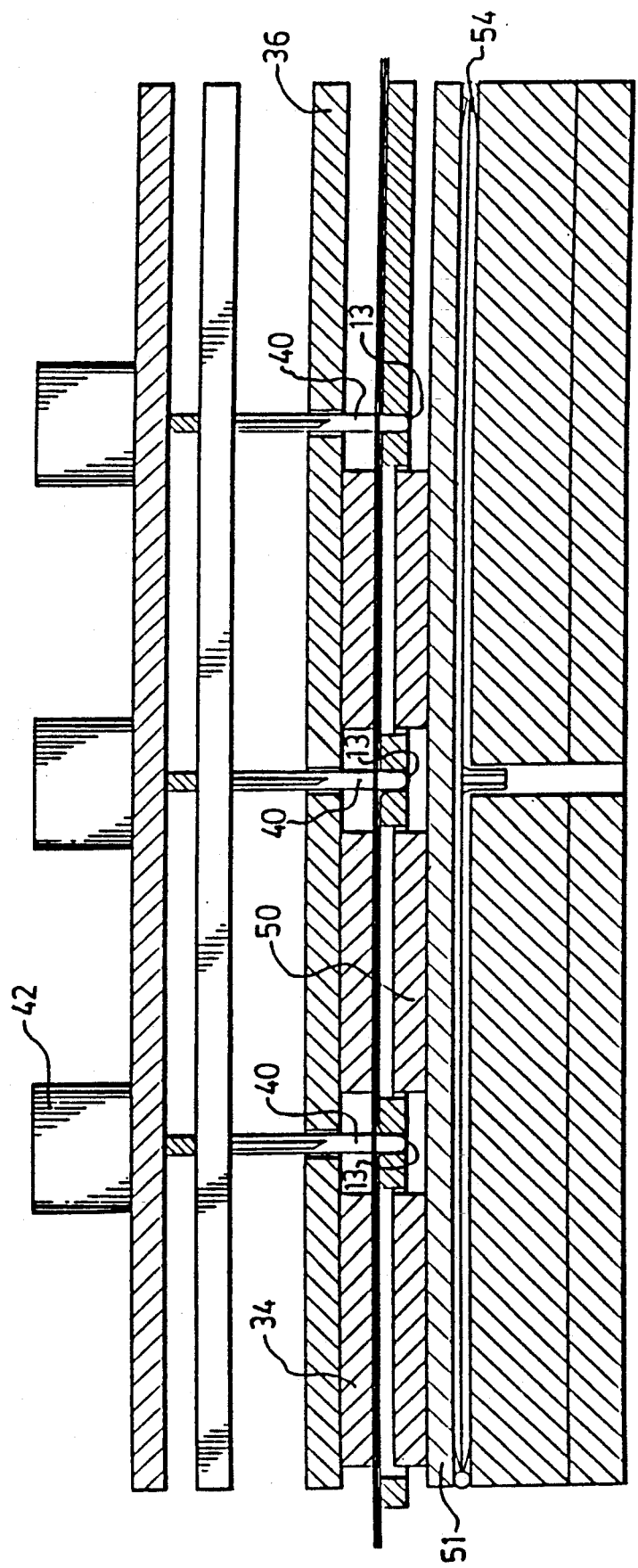
Figure 4E:
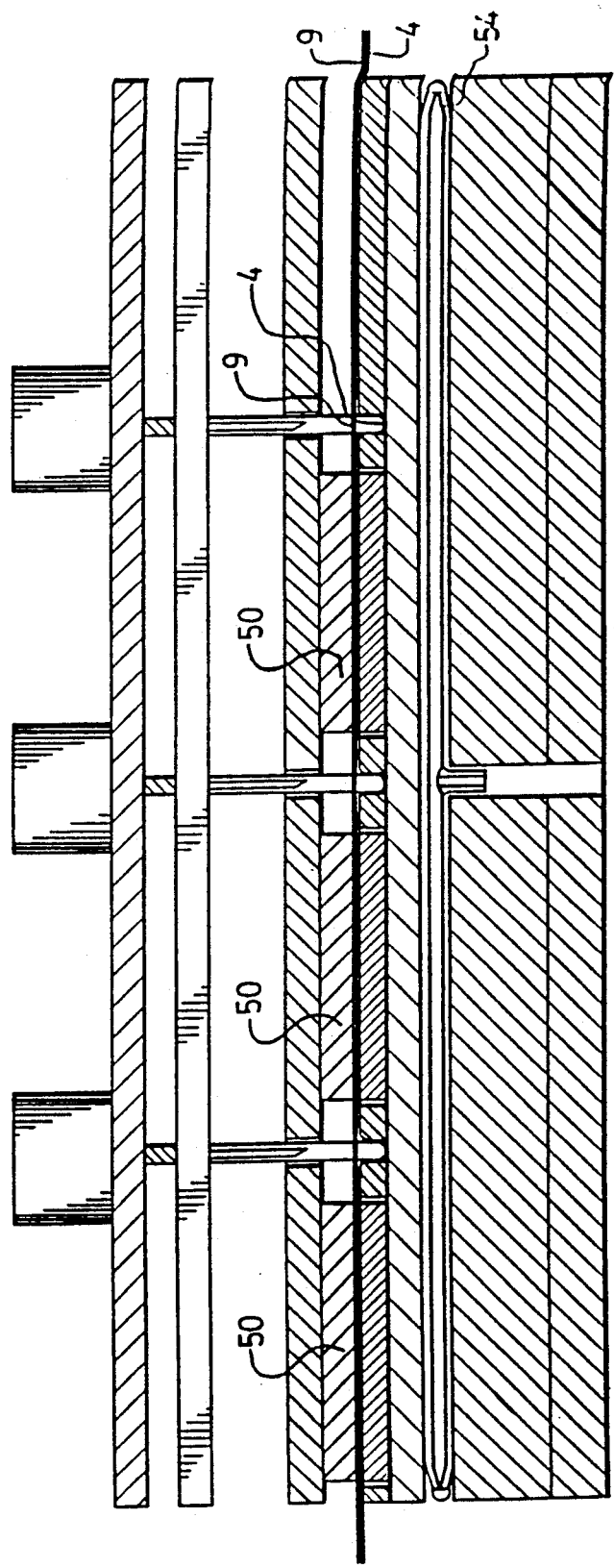
Figure 4F:
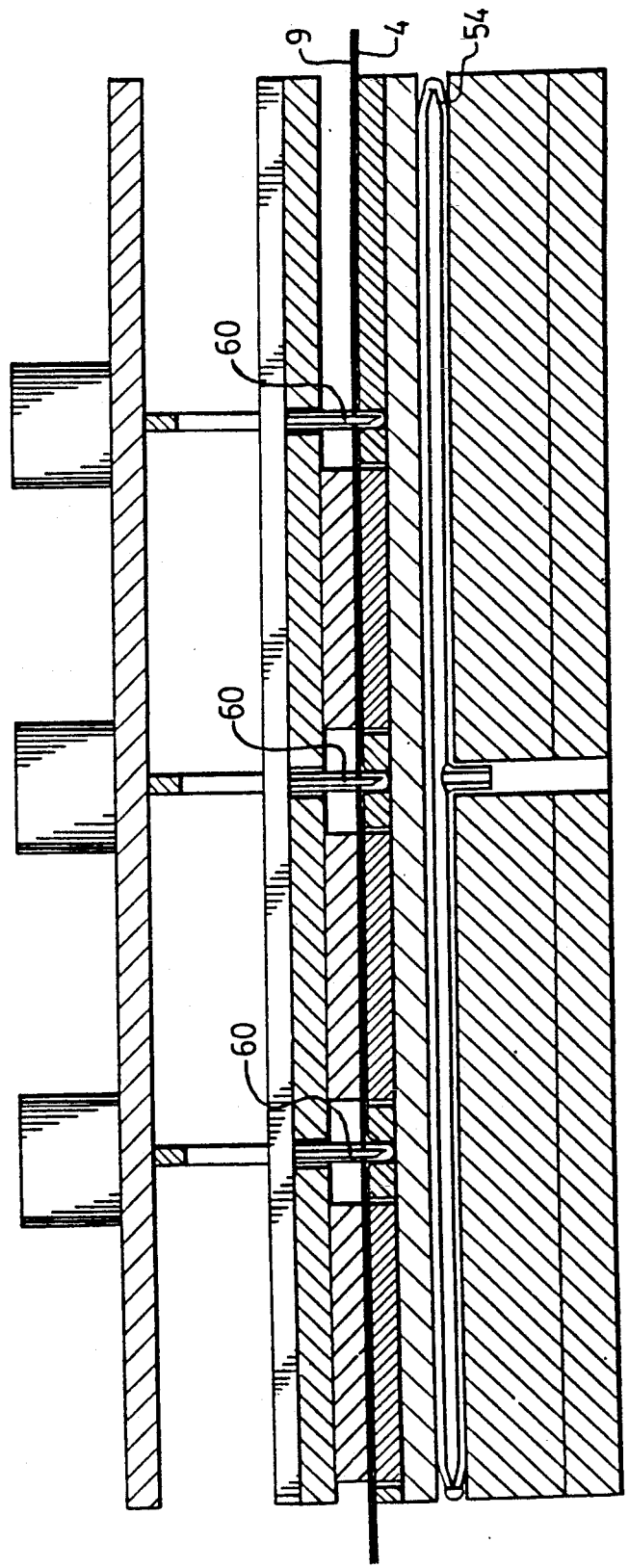
Figure 5A:
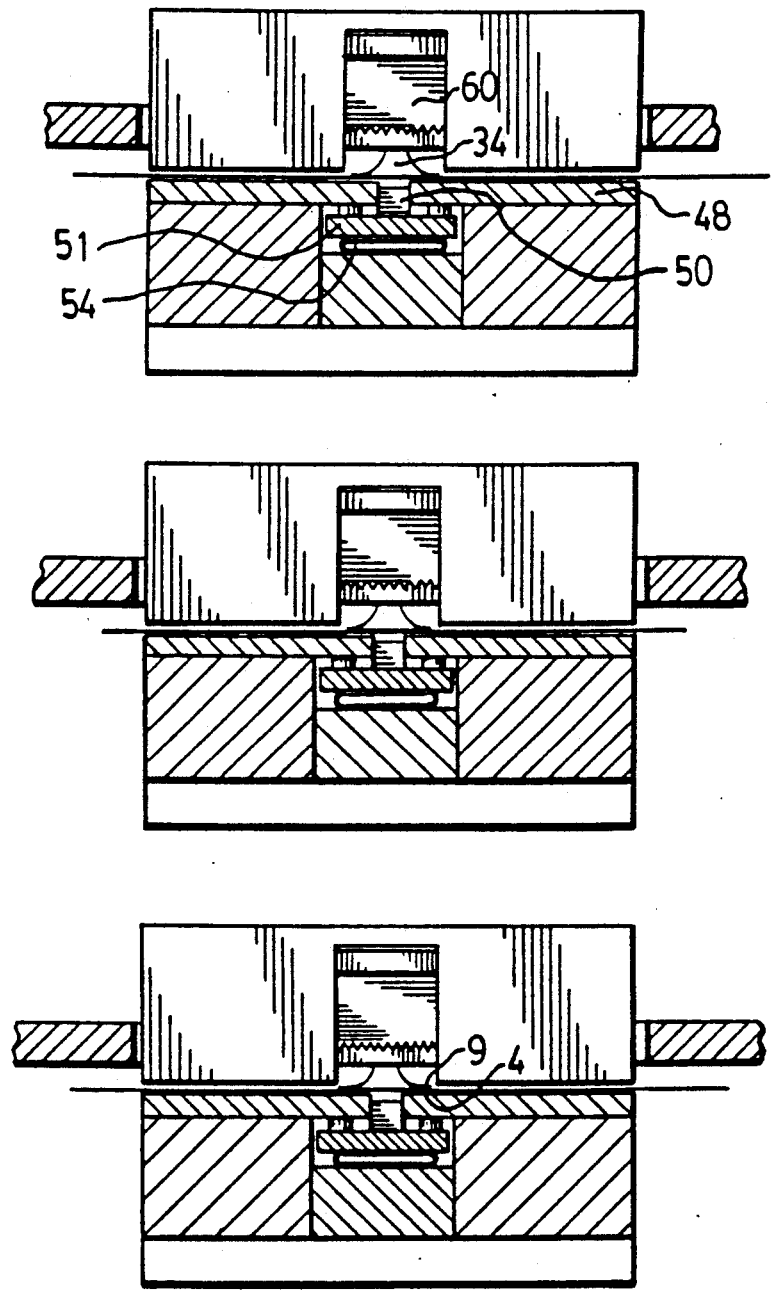
FIGS. 5(a) through 5(f) are end elevations of the zipper application apparatus corresponding relatively to FIGS. 4(a) through 4(f)
Figure 5B:
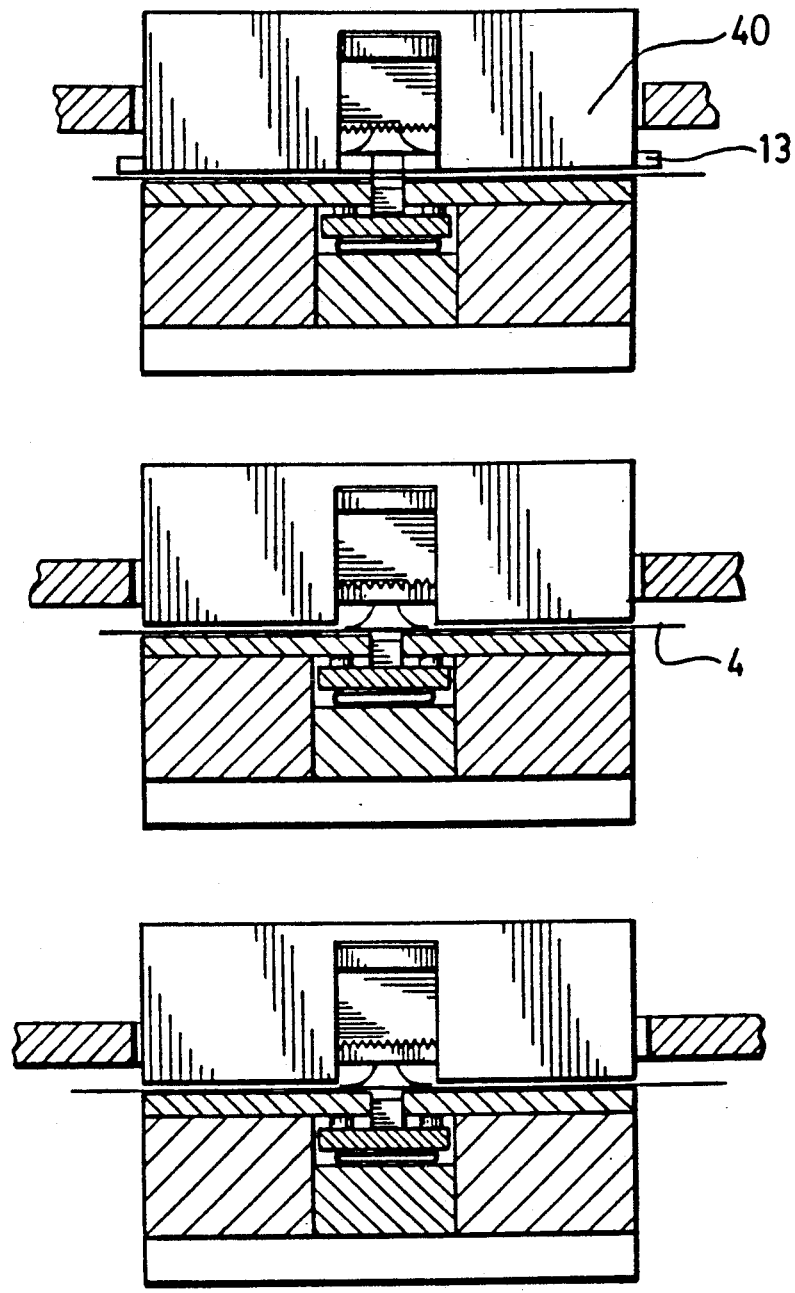
Figure 5C:
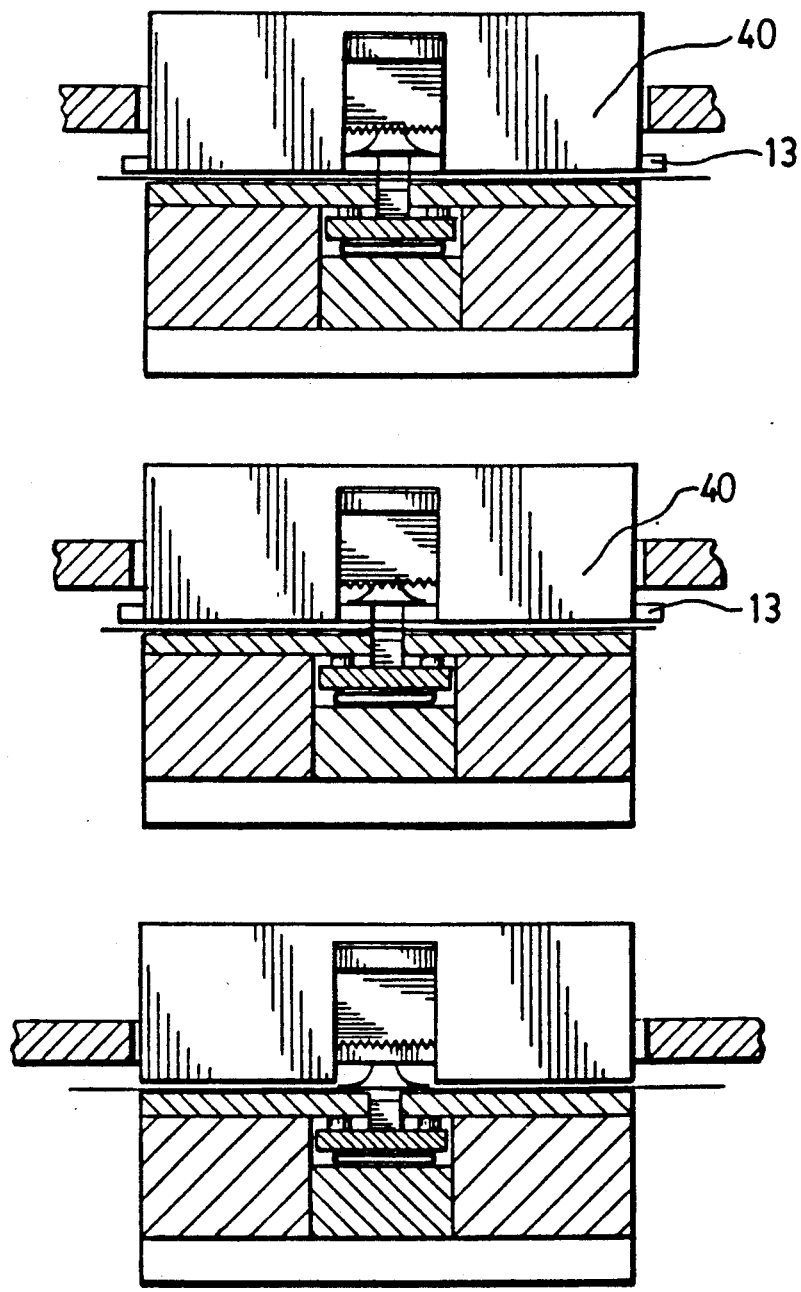
Figure 5D:
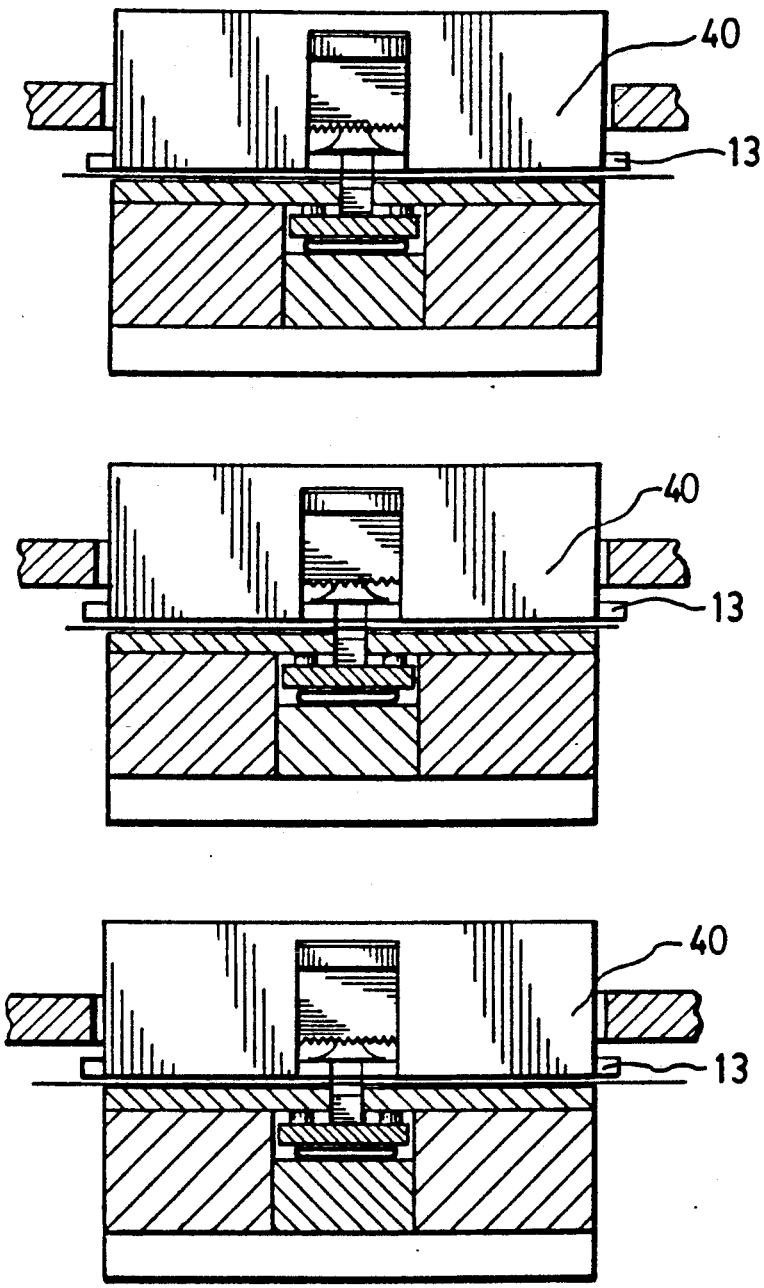
Figure 5E:
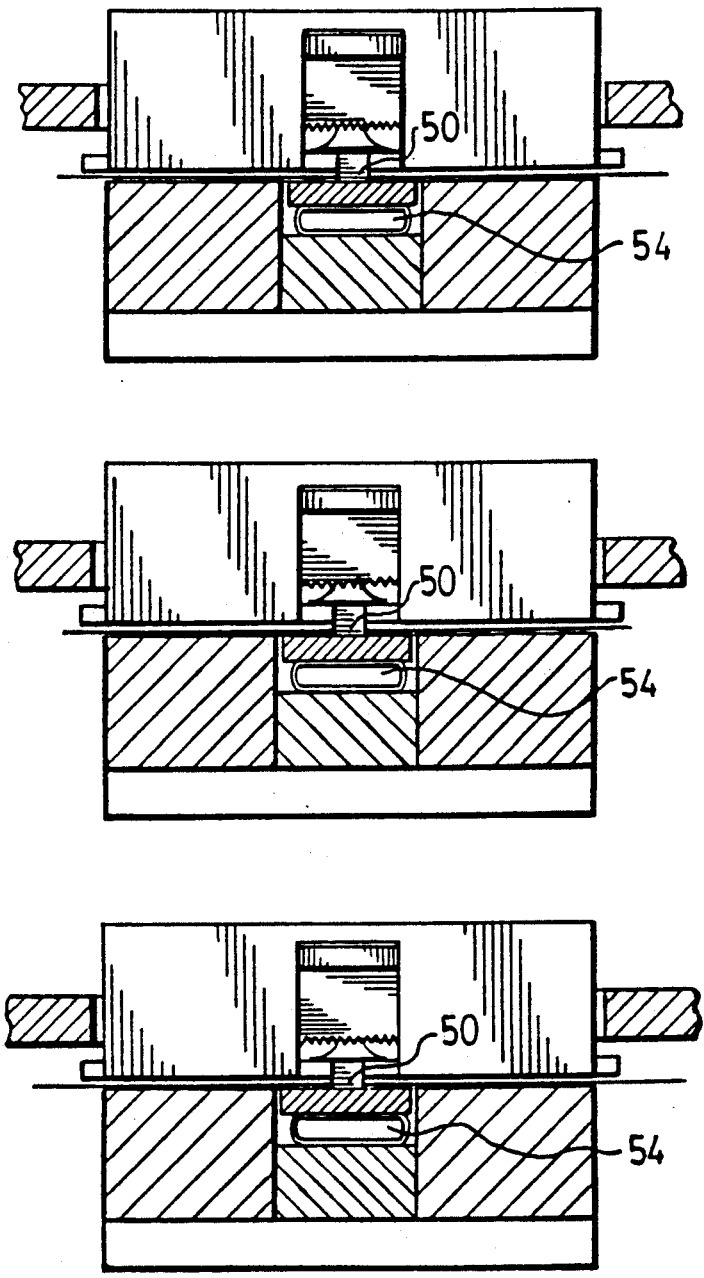
Figure 5F:
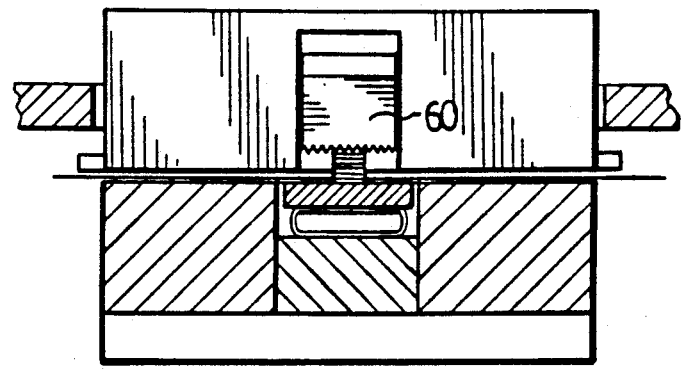
Figure 5F:
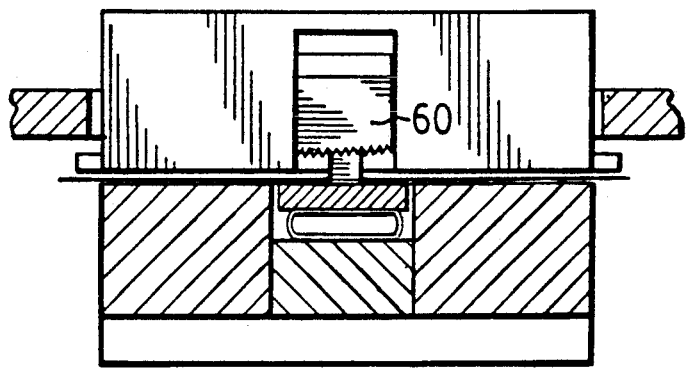
Figure 5F:
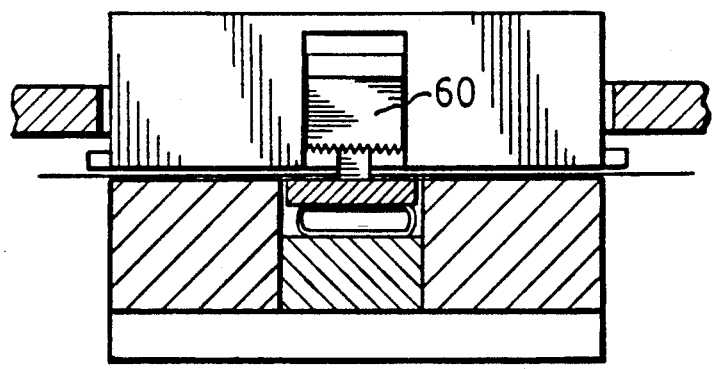

FIGS. 3, 4 and 5 illustrate the preferred apparatus and how the resealable vacuum packages are produced according to the invention. The apparatus is most clearly seen in FIG. 3; the method of forming the packages is most clearly seen in FIG. 4, i.e. in FIGS. 4(a) through 4(f), with reference to corresponding FIGS. 5(a) through 5(f).

With reference to FIG. 4, the method of forming the packages will now be described as simply as possible. FIG. 4(a), the first stage in the operating cycle, shows the lower web 4, e.g. a polyethylene substrate, and zipper material 9, positioned in the apparatus, ready for the start of the cycle. In the apparatus as shown in FIG. 4, the web and zipper material have been advanced into the apparatus from the left. FIG. 4(b), the second stage, shows a lateral loop 13 being formed in the lower web by the forwardmost forming bar 40. In FIG. 4(c), the third stage, a lateral loop 13 is formed by the middle forming bar 40. In FIG. 4(d), the fourth stage, a lateral loop 13 is formed by the rearmost forming bar 40. In FIG. 4(e), the fifth stage, heated bonding bars 50 mounted on a plate 51 are forced upwardly by an inflatable pneumatic bag 54, to bond the lower web 4 to the zipper material 9, with the zipper material bridging the gaps formed by the loops. Simultaneously or slightly later, as shown in FIG. 4(f), cutter knives 60 are driven downwardly to cut the zipper material. The bonding bars and knives then retract to their FIG. 4(a) positions, and the web is then pulled forward out of this zipper application assembly, whereupon it resumes its normal flat configuration. This produces discontinuities in the zipper material relative to the lower web, the length of the discontinuities, typically about 15 mm, of course corresponding to the dimensions of the lateral loops. The packages can therefore be sealed beyond the ends of the zipper material beads 8, by sealing through the area of the discontinuity. This produces the packages shown in FIG. 1, in which each package has a continuous sealed area 6 with the zipper beads 8 terminating inboard of the outer periphery of the sealed area.

Depending on the size of the lateral loops relative to the width of the sealed area, a small opening may be left between the end of the zipper beads 8 and the sealed area 6, which is of relatively little consequence to the end user, since it does not affect the integrity of the vacuum seal. It is more important that the vacuum seal be maintained on the shelf. Once the product has been opened by he consumer, it is not critical that the seal be airtight. Preferably, however, the zipper beads terminate just within the sealed area 6, so that there is no such gap.

In its simplest form, the method thus includes the steps of forming a lateral loop in the lower web with zipper material positioned across the area of the loop, cutting the zipper material, and then straightening out the web.

Referring to FIG. 3 in particular, the specific preferred zipper application apparatus 20 will now be described in greater detail. As seen in FIG. 2, it receives the lower web 4 of packaging material, e.g. polyethylene, from the lower web roll 5. It also receives zipper material 9 from a zipper material roll 10. As mentioned above, the zipper material used in the preferred embodiment has dual zippers, so that two packages are formed in parallel along the line.

The lower web 4 is advanced into the zipper application assembly 20. In the illustrated embodiment, two parallel rows of three packages each are handled at one time. Obviously, more or fewer packages could be dealt with depending on the size of the assembly, without varying the principle of the invention.

The zipper material is fed in via a guide shoe 34 attached to the underside of an upper guide plate 36. The guide shoe serves to locate the material properly as well keep the bonding flanges 38 of the upper zipper halves 11 (see FIG. 6) clear, by virtue of them being positioned on the upper surface of the guide shoe, so that they are not bonded to the lower web 4.

The lateral loop is formed by virtue of loop forming bars 40 which are actuated by pneumatic cylinders 42 to press the lower web 4 downwardly through slots 44 in the upper guide plate 36 into grooves 46 in the table 48. In the illustrated embodiment, since six packages are being handled in two parallel rows, there are three grooves 46, one at the front of each package row. Automatic controls actuate the pneumatic cylinders in rapid sequence, so that the frontmost lateral loop of the three is formed, then the middle loop, then the rearmost loop. This timing is required so that the extra web material required to form each loop can be drawn from the roll 5, or rather from the loop formed around the tensioning roller 114. The tensioning roller 114 moves upwardly as material is drawn quickly, and then moves back down under the tension of its spring arm to draw material from the roll 5.

After the lateral loop has been formed, the zipper material 9 is bonded along the centre portion, passing over the gaps formed by the loops. The bonding is by virtue of heated bonding bars 50 forced upwardly through bonding bar slots 52 in the table 48 by an inflatable pneumatic bag 54. The bars press the lower web against the underside of the guide shoe 34.

A portion of the upper and lower zipper halves near the front of each package are crushed together to prevent the upper zipper halves from slipping, by posts 55 mounted on the plate 51.

A cutter bar 56 is then driven downwardly through the slots 44 by pneumatic cylinders 58. This preferably takes place at the same time as the zipper material is being bonded, since the whole cycle must happen quickly (typically 15 cycles per minute), though it could take place a short time later if desired. The cutter bar carries cutter knives 60 opposite each loop location to cut the zipper material. The loop forming bars 40 have a notch 41 to accommodate the cutter bar. The guide shoe 34 is not continuous, but rather has gaps 35 through which the cutter knives can pass. The lower web 4 is then advanced to flatten out again, thus creating a gap or discontinuity in the zipper material between each package location, and is advanced far enough to position the next three rows in the apparatus for repetition of the cycle.

The now zippered lower web 4 is then fed along the conventional packaging machine for forming at the vacuum forming station 24, filling at the filling station 26, and sealing at the sealing station 28.

In the sealing station 28, illustrated in FIG. 6, the upper web 2 is fed in from roll 3 and sealed in a continuous sealed area 6 around the edge of each package, by a sealing frame 70 acting against a sealing form 72 in conventional fashion. The upper web is also bonded to the upper half of the zipper material.

In the above-described embodiment, the distance between loop-forming stations is fixed, so that different package lengths cannot be accommodated. This embodiment is preferable for cost reasons in situated where the equipment is to be used for one length of package only.

Referring now to FIGS. 7 through 12, an alternative embodiment will be described. This alternative will generally be preferred for use where packages of different length may be produced from time to time, since the distance between loop-forming stations may be varied.

Figure 7A:
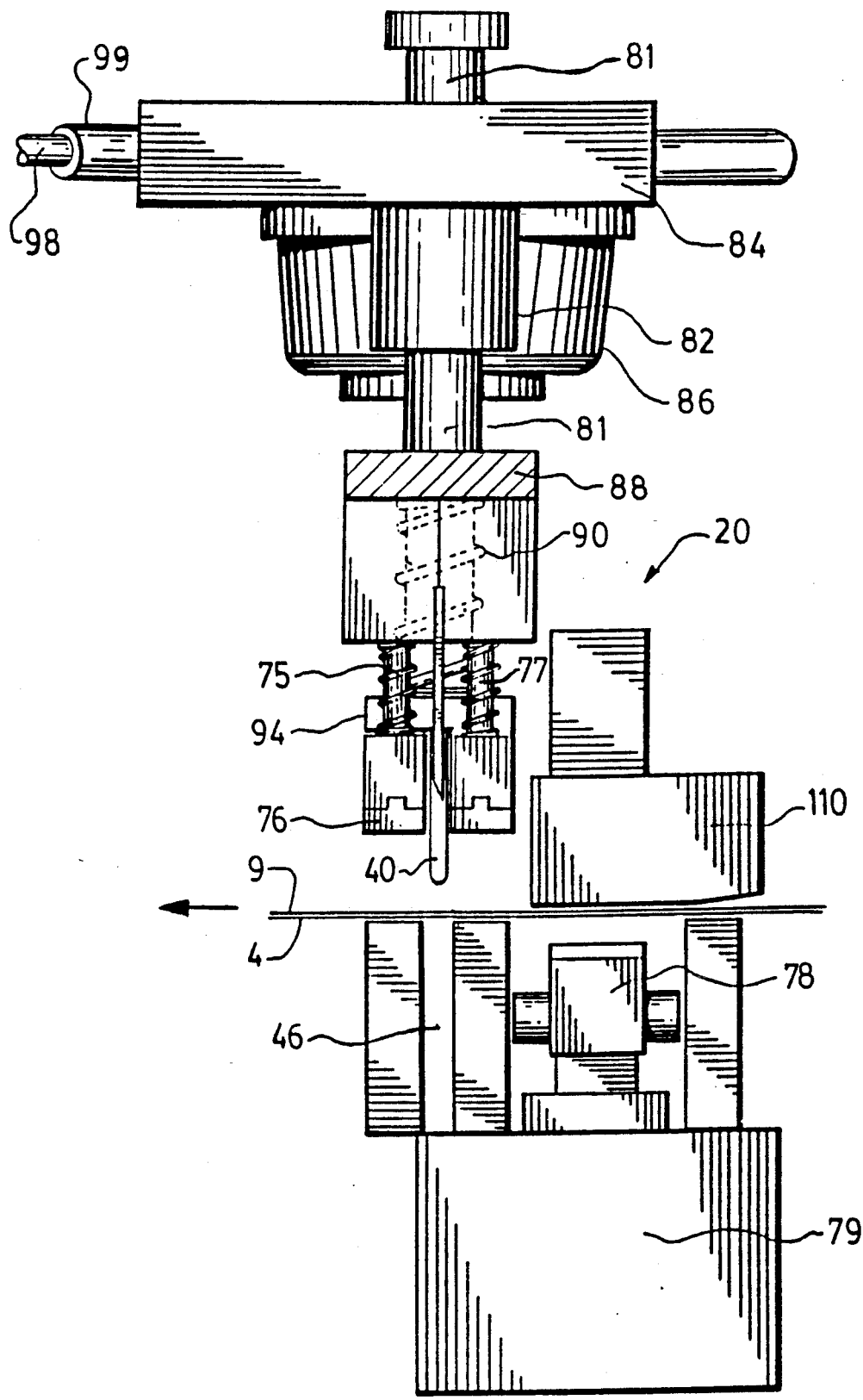
FIGS. 7(a) through 7(e) are side elevations of an alternative embodiment of the apparatus.
Figure 7B:
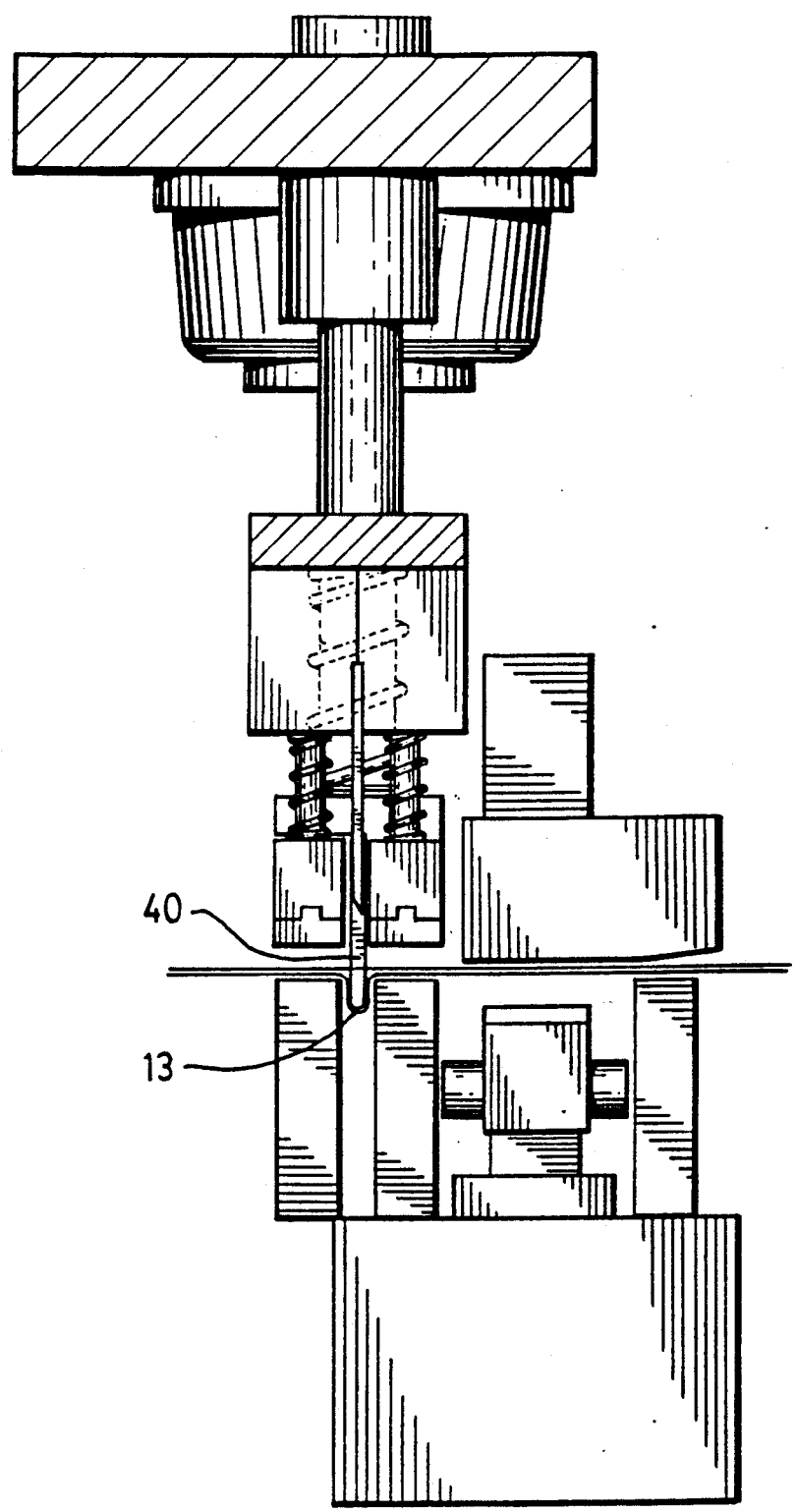
Figure 7C:
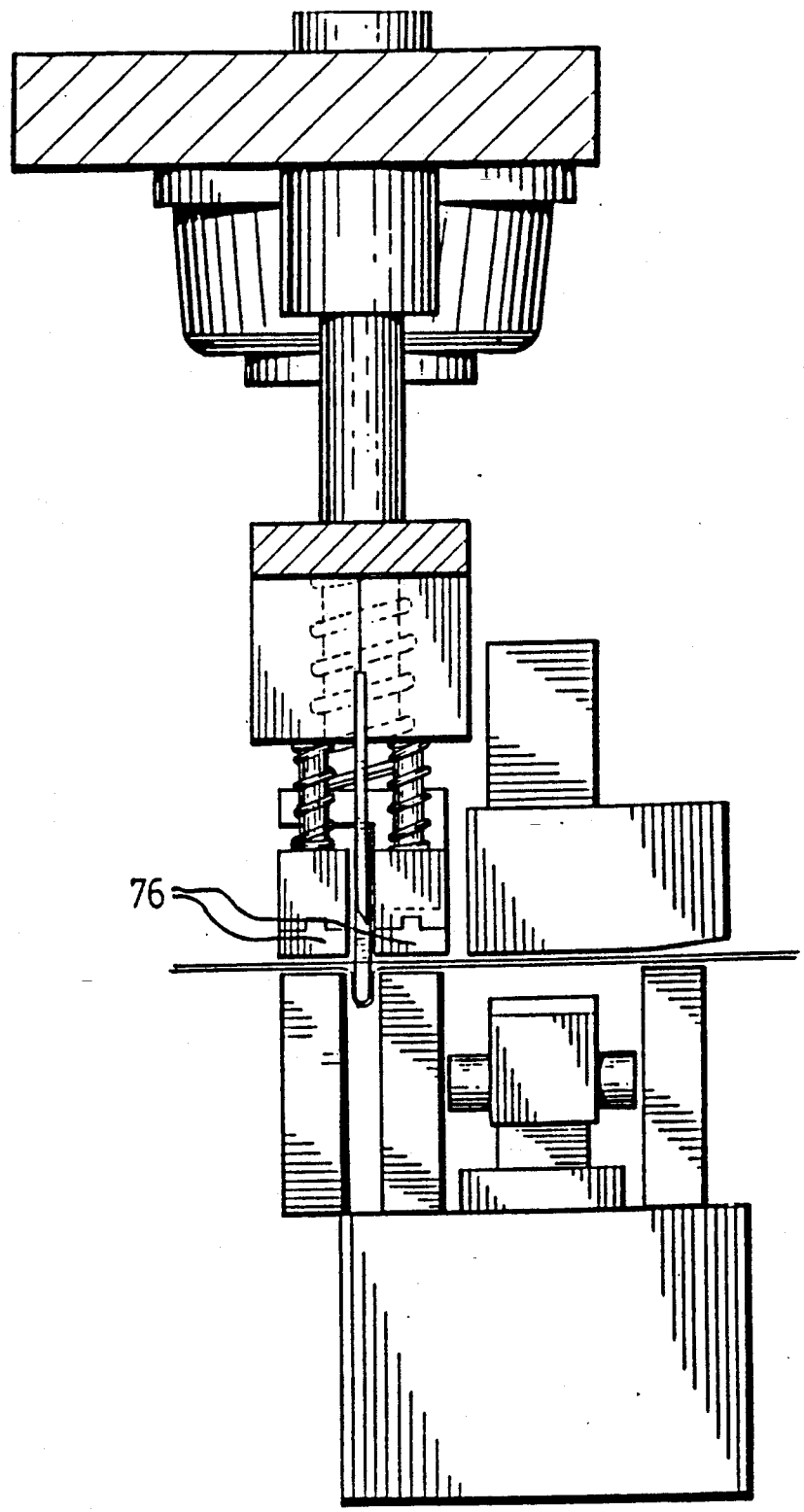
Figure 7D:
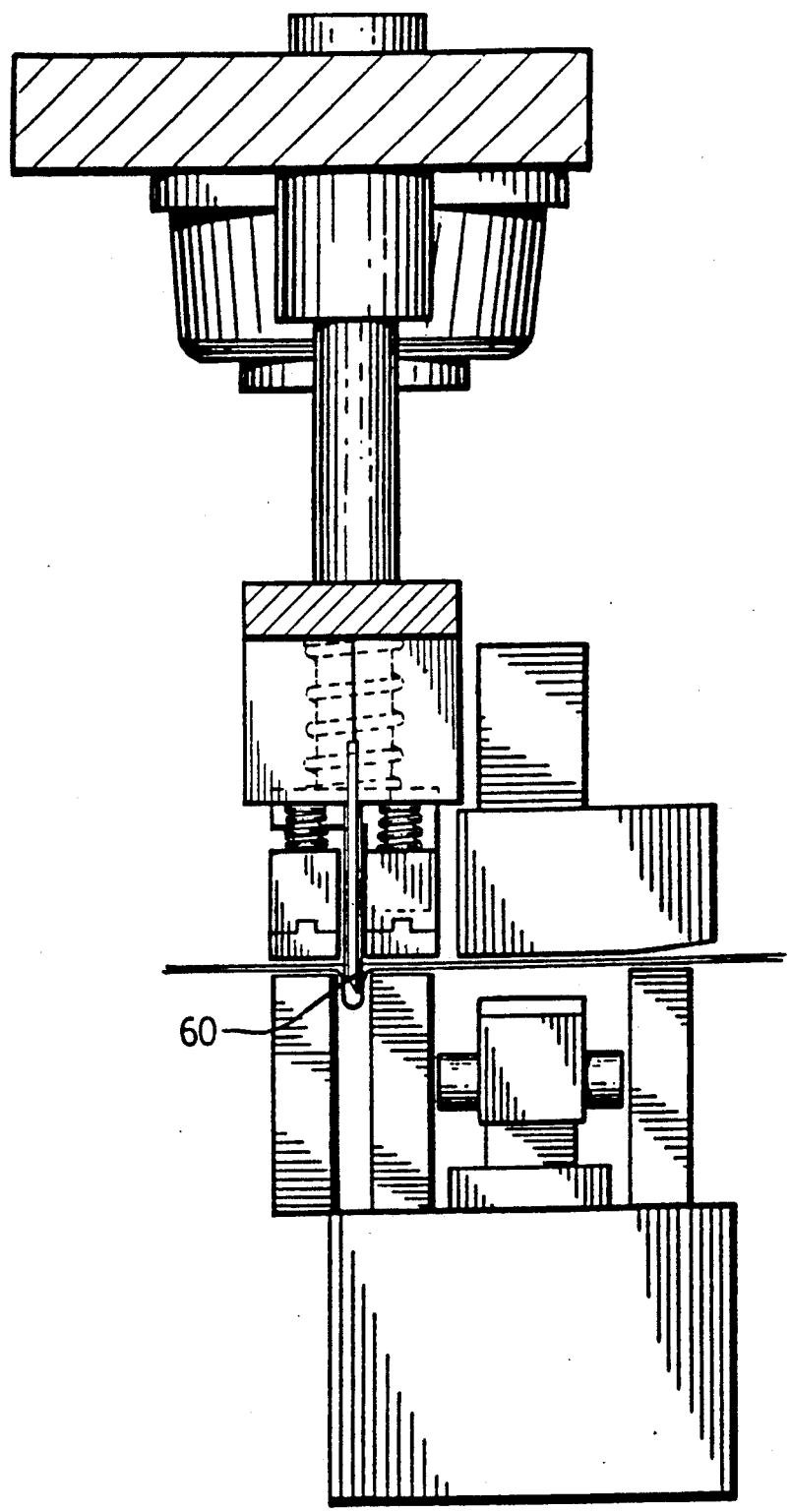
Figure 7E:
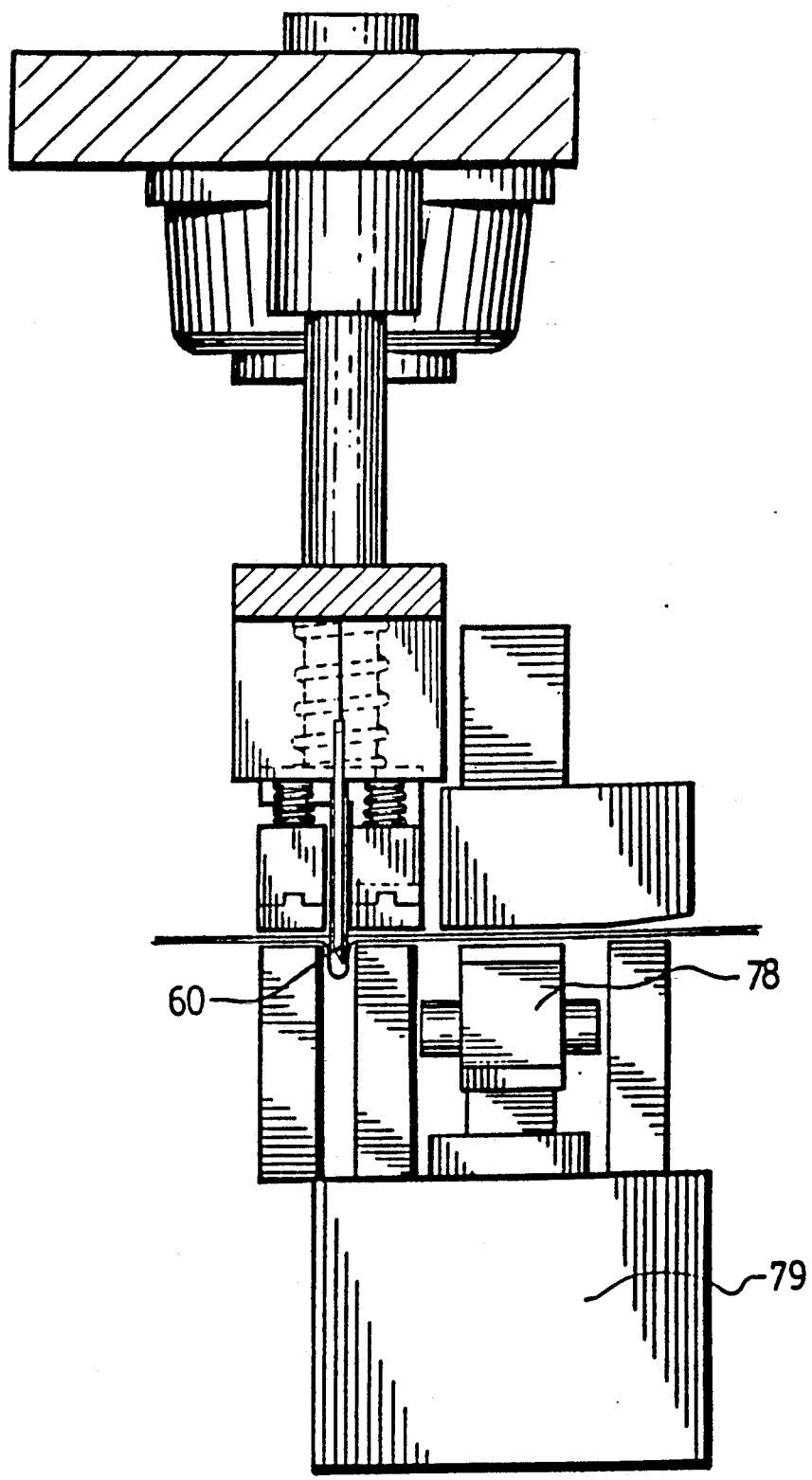

Referring to FIGS. 7(a) and 8(a), the alternative apparatus is shown in the first stage in the operating cycle. The lower web 4 and zipper material 9 are positioned in the apparatus, ready for the start of the cycle. In the apparatus as shown in FIG. 7, the web and zipper material have been advanced into the apparatus from the right. FIGS 7(b) and 8(b) show the second step, in which a lateral loop 13 is formed in the lower web by the forming bar 40. FIGS. 7(c) and 8(c) show the third step, in which the zipper material is clamped down by clamping bars 76. FIGS. 7(d) and 8(d) show the fourth step, in which a cutter knife 60 is driven downwardly to cut the zipper material. FIGS. 7(e) and 8(e) show the final step, in which a tack seal bar 78 is forced upwardly by a pneumatic cylinder 79, to tack the lower web 4 to the zipper material 9, with the zipper material bridging the gap formed by the loop. The components then retract to their FIG. 7(a) positions, and the web is then pulled forward out of this zipper application assembly, whereupon it resumes its normal flat configuration, producing the gap.

As in the first-described embodiment, several such stations may be arranged in series, so that more than one row of packages is produced at a time. The timing must be arranged as described above such that the loops are formed in sequence from front to rear.

It should be appreciated that the step illustrated in FIG. 7(e), i.e. the "final" step of producing the tack seal, need not follow the other steps in strict sequence. It can take place starting at any time as soon as the loop is formed.

In this alternative apparatus, the sequence of the steps in FIGS. 7(a) through 7(d) preferably takes place by downward actuation of a single assembly, rather than by separate actuation of a loop forming bar, a clamping means, and a cutter knife.

At each station, two loop forming bars 40, one on either side of the zipper area, are each mounted on two support shafts 81. The support shafts are moveable up and down through guide bushings 82 installed on a horizontal upper frame member 84. Two pneumatic cylinders 86 at each station drive a crossbar 88 up and down. As the crossbar moves down, the loop forming bars form the loop. As the crossbar moves farther down, the loop forming bars mounted on blocks 94 are pushed via springs 90 until they bottom out in the groove on the table (FIGS. 7(b) and 8(b)). Mounted on the crossbar is a clamping and cutting assembly 92, having two clamping bars 76 suspended from pins 77, with springs 75 between the clamping bars and the clamping bar supports 74, and a cutting knife 60 clamped between the clamping bar supports and projecting downwardly therefrom. Further downward movement of the crossbar starts to compress the springs 90 between the blocks 94 and the crossbar, and presses the clamping bars against the zipper material and lower web (FIGS. 7(c) and 8(c)). Further downward movement compresses the springs 75, and pushes the cutting knife 60 through the zipper material (FIGS. 7(d) and 8(d)). Retraction of the cylinders 86 returns the crossbar to its upper limit (FIGS. 7(a) and 8(a)), and lifts the loop forming bars away from the table by virtue of lifters 96 installed in grooves on the support shafts by spring clips 97 such the upper surface of the crossbar engages the lifters in its upward travel to lift the support shafts to their FIGS. 7(a) and 8(a) position.

Figure 8:
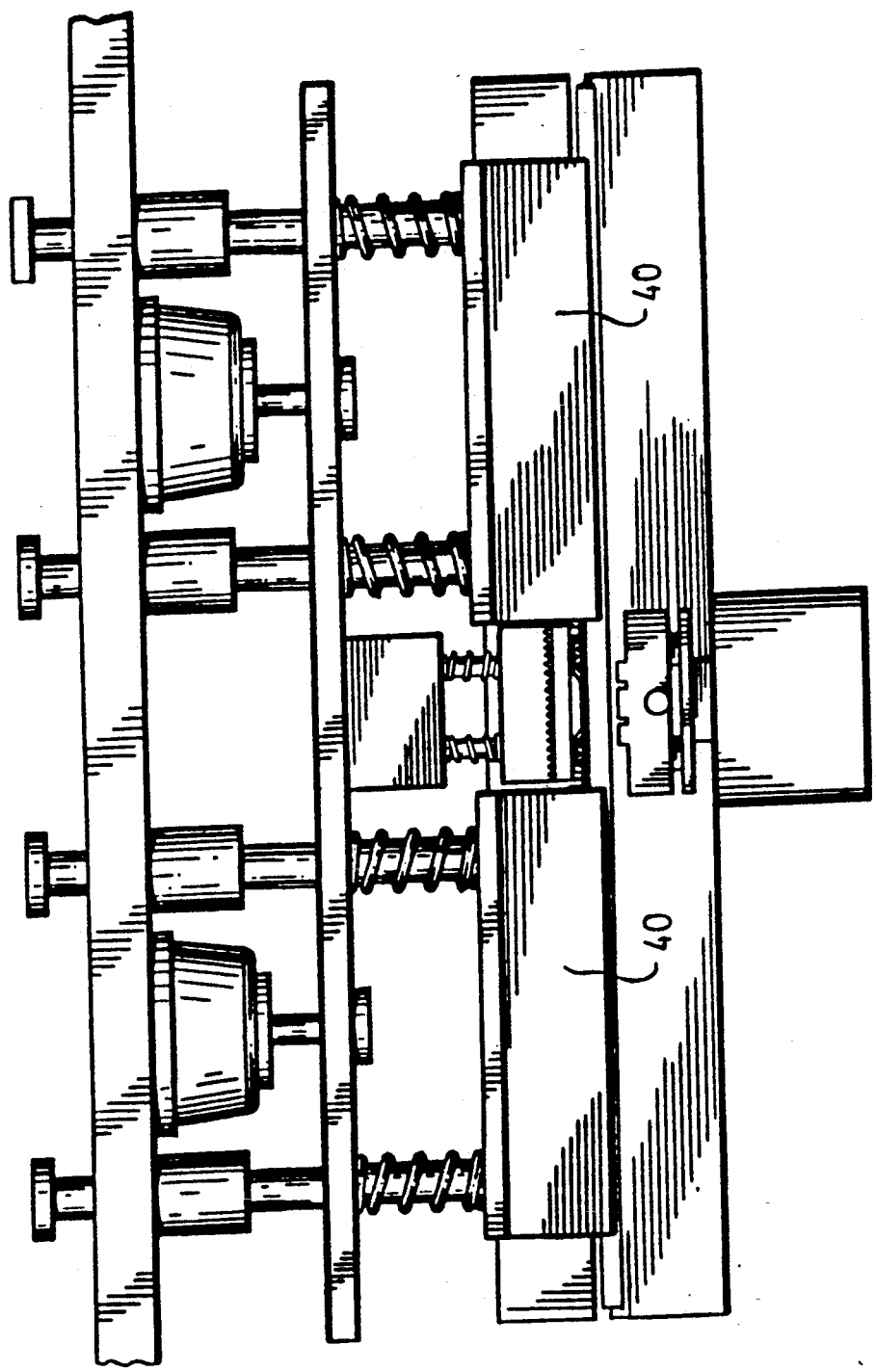
FIGS. 8(a) through 8(e) are end elevations of the alternative embodiment of the apparatus, corresponding respectively to FIGS. 7(a) through 7(e)
Figure 8C:
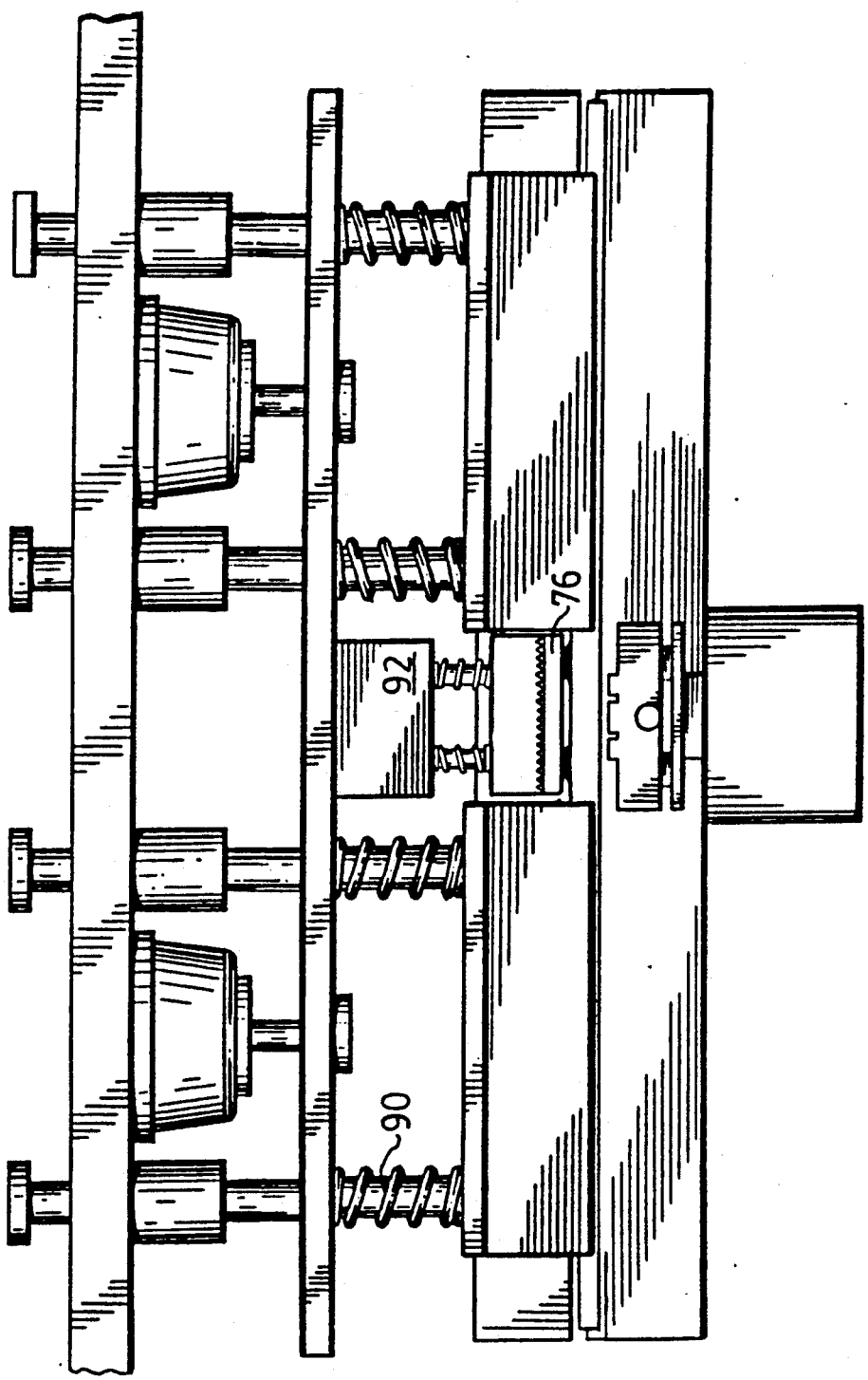
Figure 8:
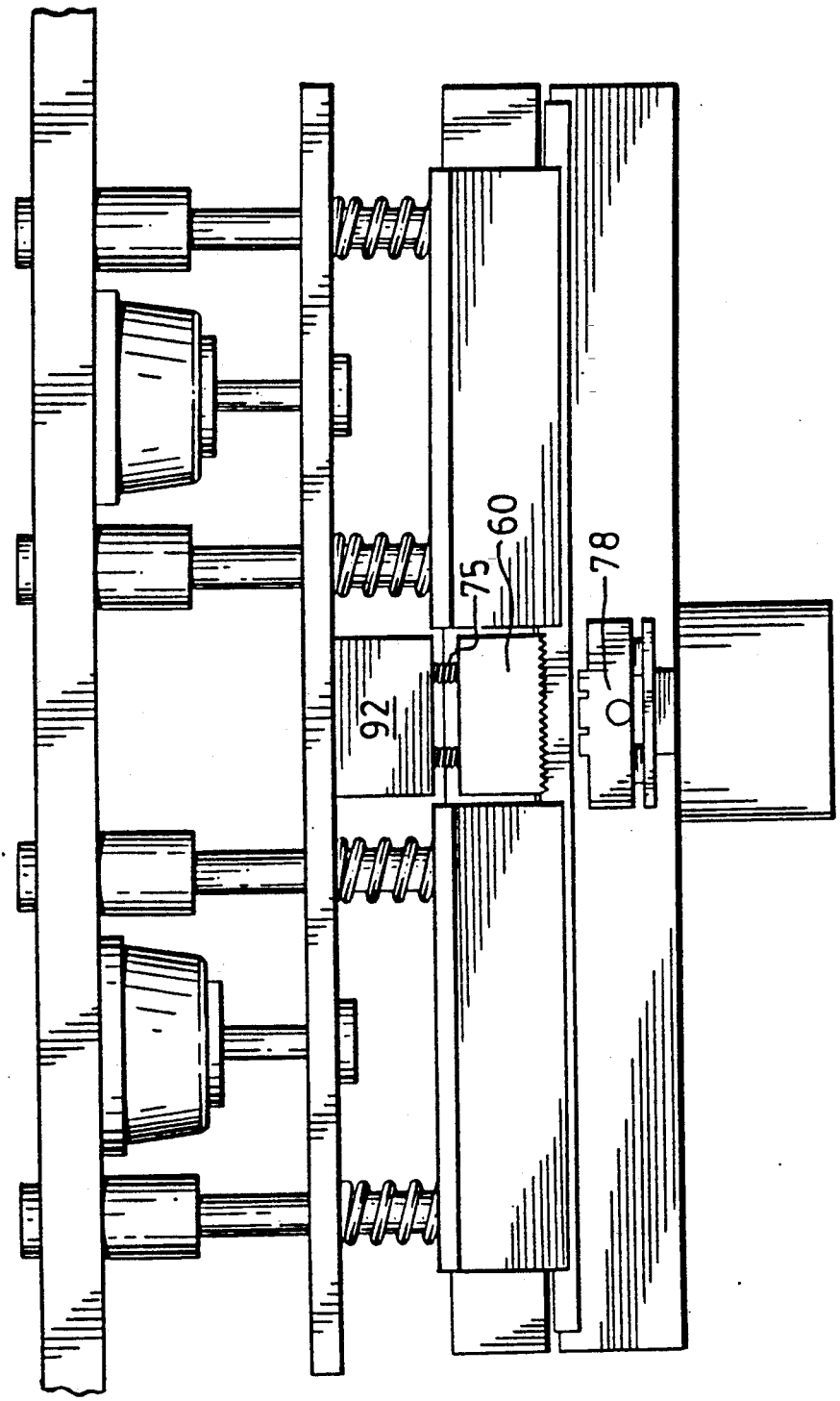
Figure 8:
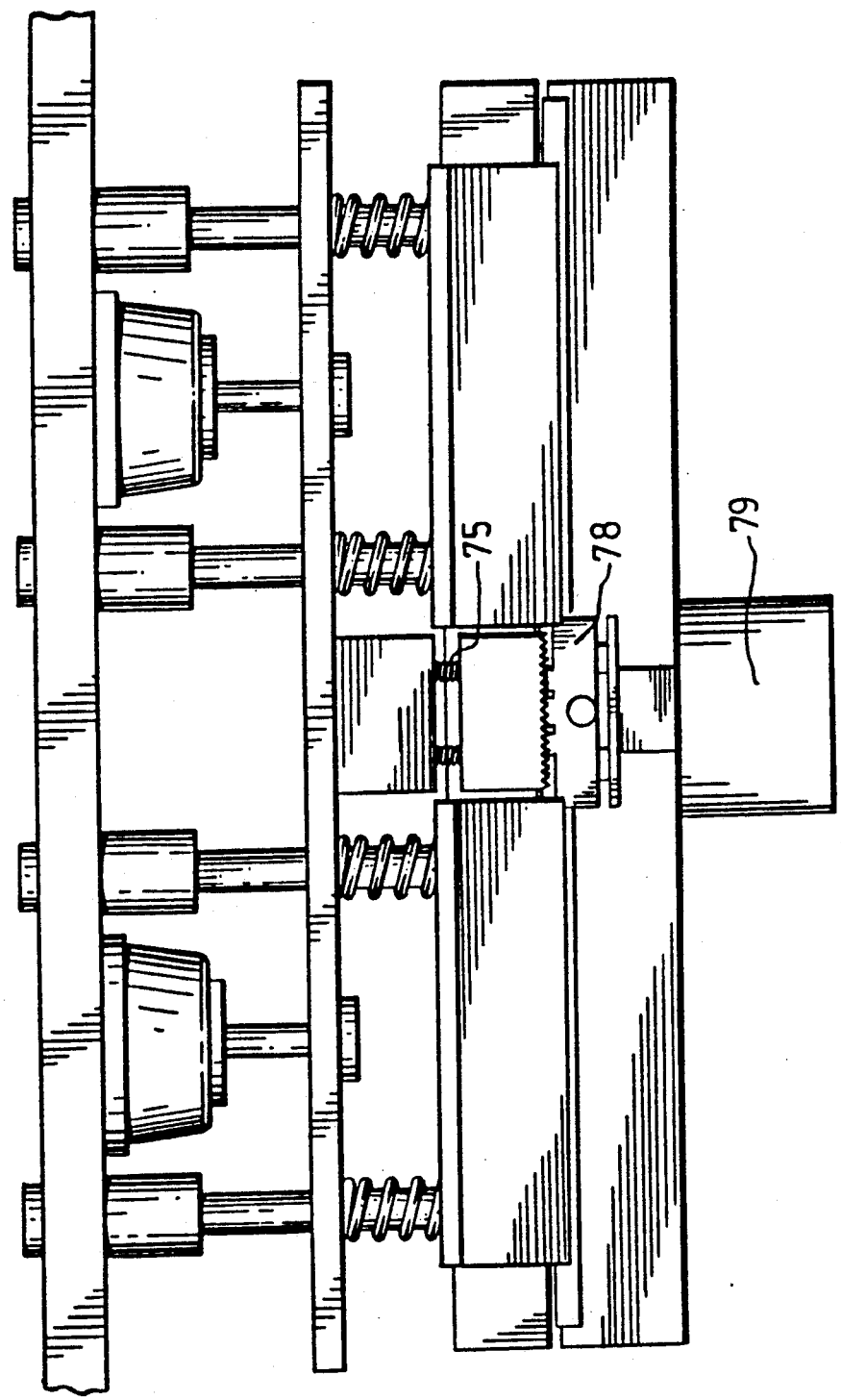
Figure 9:
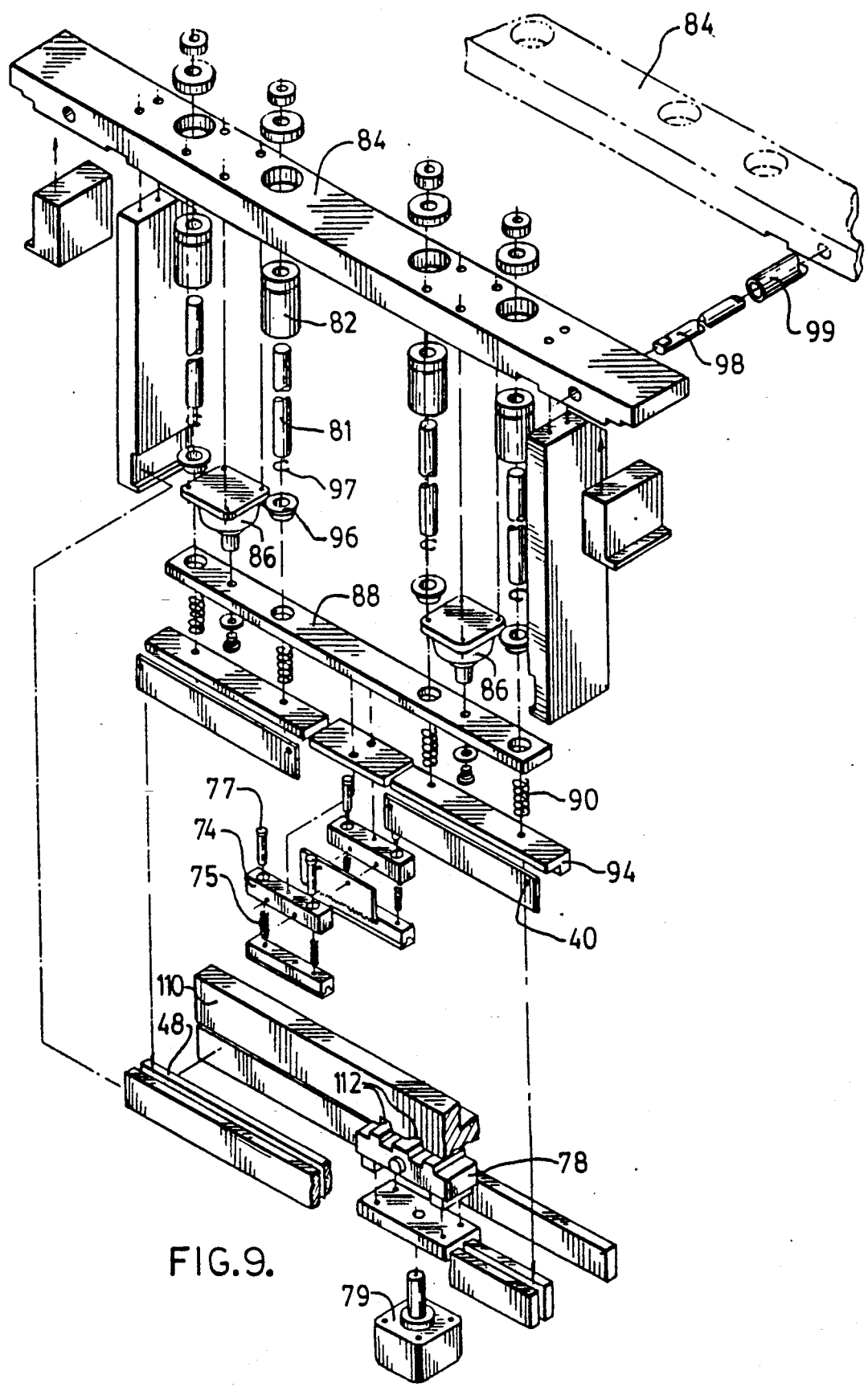
FIG. 9 is an exploded diagram of one section of the alternative embodiment.
Figure 10:
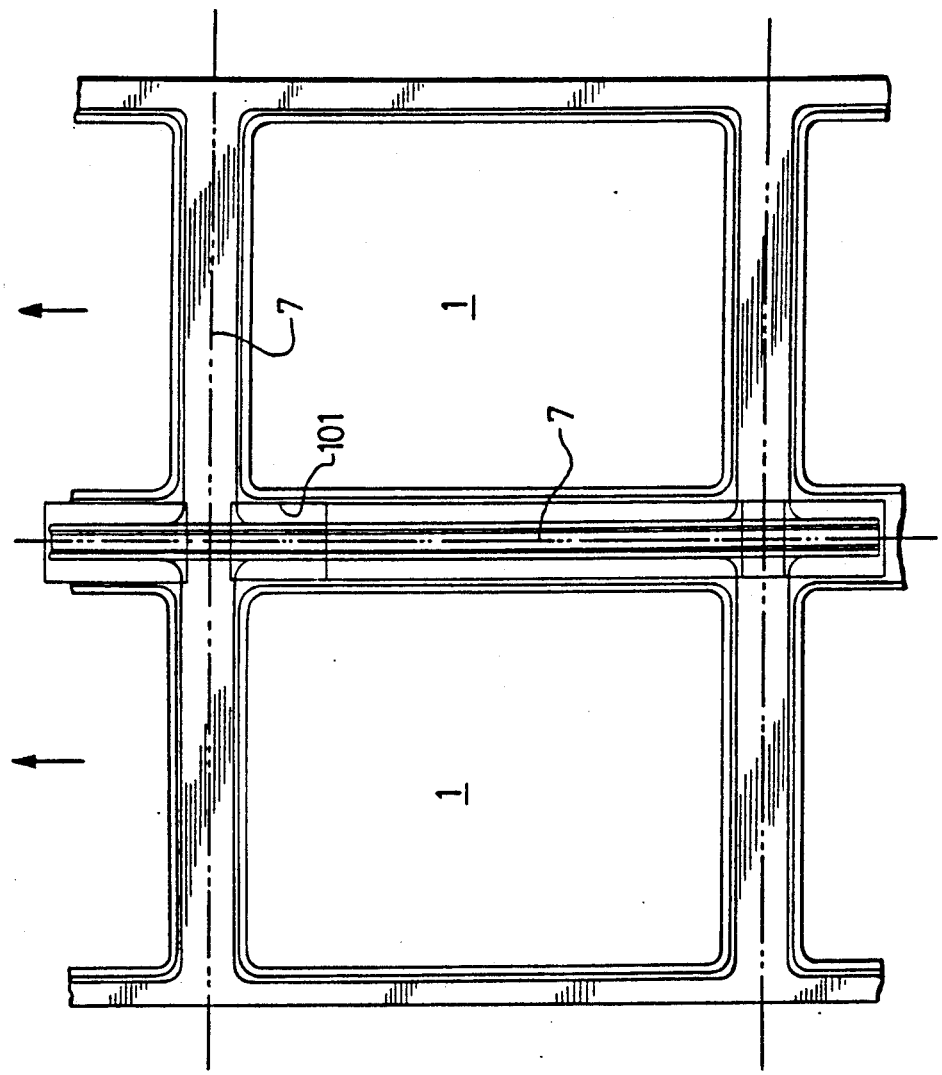
FIG. 10 is a plan view of a resealable vacuum package produced on the alternative embodiment of the apparatus, highlighting a tack seal area.

FIG. 9 shows the individual components in greater detail than either of FIGS. 7 and 8.

Adjustability of the spacing of the stations comes by virtue of the fact that the horizontal upper frame member 84 for each station is positioned on guide rods 98 at each side. Different spacings can be achieved simply by inserting different lengths of spacer sleeves 99 over the guide rods and between these upper frame members.

In the first-described embodiment, the entire length of the zipper material was bonded to the lower web at this stage. However, since in this alternative embodiment only a portion 101 of the length of zipper material is tacked (see FIGS. 7 and 10) at this stage in any event, it does not matter how long the package is.

In the alternative embodiment, the zipper material is instead sealed to the lower web in the forming section of the apparatus. FIG. 11 shows a heated sealing bar 103 installed in the deep draw form 105 of the forming section, moveable upwardly against the deep draw lid 106 via a pneumatic bag 107. This seals the lower web 4 to the zipper material substrate 12. The upper zipper halves 11 are also bonded to the substrate 12, though this is not a permanent bond, since the zipper material, as known in the prior art, is supplied with a "contaminant" between the upper halves and the substrate to prevent secure bonding. Effecting the bond in the forming section rather than in the zipper application section preserves the flexibility of package length in the zipper application section. In the forming section, different sized forms must be used for different sized packages no matter what.

In the first-described embodiment, the zipper material is fed in via a guide shoe 34 attached to the underside of an upper guide plate 36. Again so that the apparatus can be adapted for packages of different lengths, a different approach is used in the alternative embodiment. As seen in FIG. 8 and perhaps best in FIG. 9, a guide plate 110 is positioned above the table 48, providing a narrow slot through which the lower web runs. In the area of the zipper material, the guide plate has notches 112 conforming roughly to the cross-section of the zipper material, so that the zipper material is guided by these notches.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, while the use of a reclosable closure is particularly useful for vacuum packaged products such as many food items, the same structure could be used, if desired for some reason, for reclosable packages other than those which are vacuum sealed.

Also, while reference here has been primarily to a sealed "area", it should be apparent that the invention could also apply to a sealed "line", if such a seal was deemed adequate for the product being packaged. In such a case, the line of the seal would pass through the gap, and the zipper beads would terminated somewhere short of the line. It should therefore also be apparent that the invention would be equally applicable to forming resealable plastic bags, where the sealed lines would form the three closed edges of the bag and the temporarily sealed but openable and resealable edge of the bag. Where appropriate, the word "area" should be interpreted to include a line, since even a "line" in this context has a finite though small area.

What is claimed as the invention is:

1. A resealable package comprising upper and lower webs defining a product containing area having a periphery between said webs, said webs being continuously sealed to each other around the periphery of the product containing area by a peripheral seal to form a sealed area, and resealable zipper closure material positioned along one edge of said product containing area, and said one edge having ends said zipper closure material comprising interlocking beads which effect an openable and reclosable seal, in which said zipper closure material terminates short of the ends of said one edge, with the beads positioned within the sealed area and not passing fully therethrough.

2. A resealable package as recited in claim 1, in which said package is a vacuum package.

3. A resealable package as recited in claim 1, in which said interlocking beads terminate slightly within said sealed area.

4. A resealable package as recited in claim 3, in which said package is a vacuum package.

* * * * *